US011395031B1

(12) United States Patent
Gomez et al.

(10) Patent No.: US 11,395,031 B1
(45) Date of Patent: Jul. 19, 2022

(54) AUDIO AND VIDEO SYNCHRONIZATION

(71) Applicants: AT&T Intellectual Property I, L.P., Atlanta, GA (US); AT&T Mobility II LLC, Atlanta, GA (US)

(72) Inventors: Esteban Gomez, Montebello, CA (US); Manuel Briand, Santa Monica, CA (US); Kevin Culwell, Redondo Beach, CA (US); Eric Petajan, Watchung, NJ (US); Lucian Jiang-Wei, Los Angeles, CA (US); Nicholas Covey, Torrance, CA (US); Rajakumar Adhikari, Torrance, CA (US); Arlene Cava, Sylmar, CA (US); Xavier Riley, Los Angeles, CA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 17/215,045

(22) Filed: Mar. 29, 2021

(51) Int. Cl.
*H04N 21/43* (2011.01)
*H04N 21/8547* (2011.01)
*H04N 21/242* (2011.01)
*H04N 21/2368* (2011.01)
*H04N 21/434* (2011.01)

(52) U.S. Cl.
CPC ..... *H04N 21/43072* (2020.08); *H04N 21/242* (2013.01); *H04N 21/8547* (2013.01); *H04N 21/2368* (2013.01); *H04N 21/4341* (2013.01)

(58) Field of Classification Search
CPC .......... H04N 21/43072; H04N 21/242; H04N 21/8547; H04N 21/2368; H04N 21/4341
See application file for complete search history.

(56) References Cited

U.S. PATENT DOCUMENTS

| 10,313,717 B2 | 6/2019 | Petajan et al. |
| 10,602,203 B2 | 3/2020 | Petajan et al. |
| 2018/0077445 A1* | 3/2018 | Puntambekar ... H04N 21/23418 |

* cited by examiner

*Primary Examiner* — Yassin Alata
(74) *Attorney, Agent, or Firm* — Hartman & Citrin LLC

(57) ABSTRACT

Concepts and technologies disclosed herein are directed to audio and video synchronization. According to one aspect disclosed herein, an audio-video ("AV") synchronization system can simultaneously capture samples of a pre-encode media stream and a post-encode media stream. The pre-encode media stream can include AV content prior to being encoded. The post-encode media stream can include the AV content after being encoded. The AV synchronization system can align a pre-encode video component of the pre-encode media stream with a post-encode video component and can determine a video offset therebetween. The AV synchronization system can align a pre-encode audio component of the pre-encode media stream with a post-encode audio component of the post-encode media stream and can determine an audio offset therebetween. The AV synchronization system can then compare the video offset and the audio offset to determine if the post-encode media stream is synchronized with the pre-encode media stream.

17 Claims, 15 Drawing Sheets

AUDIO AND VIDEO SYNCHRONIZATION

BACKGROUND

Worldwide consumption of audio-video content (also known as "AV content") has been on a steady increase year over year. The advent of streaming services, improved Internet access capabilities, and device mobility have been strong drivers of this increase. Paramount to the user experience is the quality of the AV content. Users typically focus on the resolution of the video image, the frame rate, the presence of visual artifacts, and general audio quality. Users can become accustomed to temporary changes in any of these parameters. When the audio and video become out of synchronization, however, users may observe inconsistencies between when a person or character speaks and when their lips move. This occurrence is known as AV desynchronization, or what is colloquially known as a "lip sync" issue. While changes in the video image and/or audio quality are not ideal, these changes can be overlooked by many users and not disrupt their enjoyment of the AV content. A lip sync issue, on the other hand, is almost immediately noticed by nearly all users. As an example, singers are often cited for lip syncing at concerts or during television appearances because, as humans, we expect the movement of one's lips to directly coincide with the audio produced. Our inherent sensitivity to lip sync issues makes AV synchronization a primary goal of streaming service providers.

SUMMARY

Concepts and technologies disclosed herein are directed to audio and video synchronization. According to one aspect disclosed herein, an audio-video ("AV") synchronization system can simultaneously capture samples of a pre-encode media stream and a post-encode media stream. The pre-encode media stream can include AV content prior to being encoded. The post-encode media stream can include the AV content after being encoded. The AV synchronization system can align a pre-encode video component of the pre-encode media stream with a post-encode video component. The AV synchronization system can determine a video offset between the pre-encode video component and the post-encode video component. The AV synchronization system can align a pre-encode audio component of the pre-encode media stream with a post-encode audio component of the post-encode media stream. The AV synchronization system can determine an audio offset between the pre-encode audio component and the post-encode audio component. The AV synchronization system can then compare the video offset and the audio offset to determine if the post-encode media stream is synchronized with the pre-encode media stream.

In some embodiments, the AV synchronization system can align the pre-encode video component of the pre-encode media stream with the post-encode video component, and can align the pre-encode audio component of the pre-encode media stream with the post-encode audio component of the post-encode media stream during parallel processes. In some embodiments, the AV synchronization system also can determine the video offset between the pre-encode video component and the post-encode video component, and can determine the audio offset between the pre-encode audio component and the post-encode audio component during parallel processes.

In some embodiments, the AV synchronization system can align the pre-encode video component of the pre-encode media stream with the post-encode video component, and can determine the video offset between the pre-encode video component and the post-encode video component via execution of a non-annotated video processing algorithm module. In particular, the AV synchronization system can execute the non-annotated video processing algorithm module to: generate, from the pre-encode video component and the post-encode video component, a plurality of thumbnail images; determine a plurality of search ranges for an iterative search process used to find a first alignment point between the pre-encode video component and the post-encode video component; compare the thumbnail images to determine a plurality of distance values; determine a second alignment point between the pre-encode video component and the post-encode video component, wherein the second alignment point is where a distance value of the plurality of distance values is minimized; determine the video offset based upon the first alignment point and the second alignment point; and output the video offset.

In some embodiments, the AV synchronization system can align the pre-encode audio component of the pre-encode media stream with the post-encode audio component of the post-encode media stream, and can determine the audio offset between the pre-encode audio component and the post-encode audio component via execution of an audio-video synchronization script module. In particular, the AV synchronization system can execute the audio-video synchronization script module to: divide the pre-encode audio component and the post-encode audio component into a plurality of time slices, wherein each time slice of the plurality of time slices is associated with a corresponding video frame; generate acoustic fingerprints based upon the plurality of time slices; perform fingerprint matching using the acoustic fingerprints and determining the audio offset therefrom; compare the audio offset and the video offset; determine, based upon comparing the audio offset and the video offset, whether or not the pre-encode media stream and the post-encode media stream are synchronized; and output an audio-visual synchronization evaluation result including an indication of whether or not the pre-encode media stream and the post-encode media stream are synchronized.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Many streaming platforms experience problems with AV synchronization. The degradation in user experience has become a customer pain point, and to compound the problem, it is often difficult to diagnose the source of the problem. The concepts and technologies disclosed herein focus on video encoders as the first possible source of synchronization problems. In particular, the concepts and technologies disclosed herein provide a full reference-based analysis to compare alignment results from content pre-encode and post-encode to determine if the video encoder introduced any synchronization issues. A distinct advantage to this approach versus other solutions is the ability to detect if AV desynchronization has occurred without relying on talking heads and "lip-reading" algorithms. Moreover, streaming service providers that have access to the pre-encode (also referred to herein as "reference") video also can determine if the desynchronization has caused the audio to be "behind" or "ahead" of the video. The concepts and technologies disclosed herein focus, in part, on the ability to accurately and reliably detect when audio and video from post-encode media streams fail to retain synchronization with their pre-encode media stream counterparts. This can be achieved by simultaneously capturing samples of both the pre-encode and post-encode media streams, and then separately aligning the audio and video to determine if the offsets between video pre-encode and post-encode reflect the offsets between the audio pre-encode and post-encode.

Figure 9:
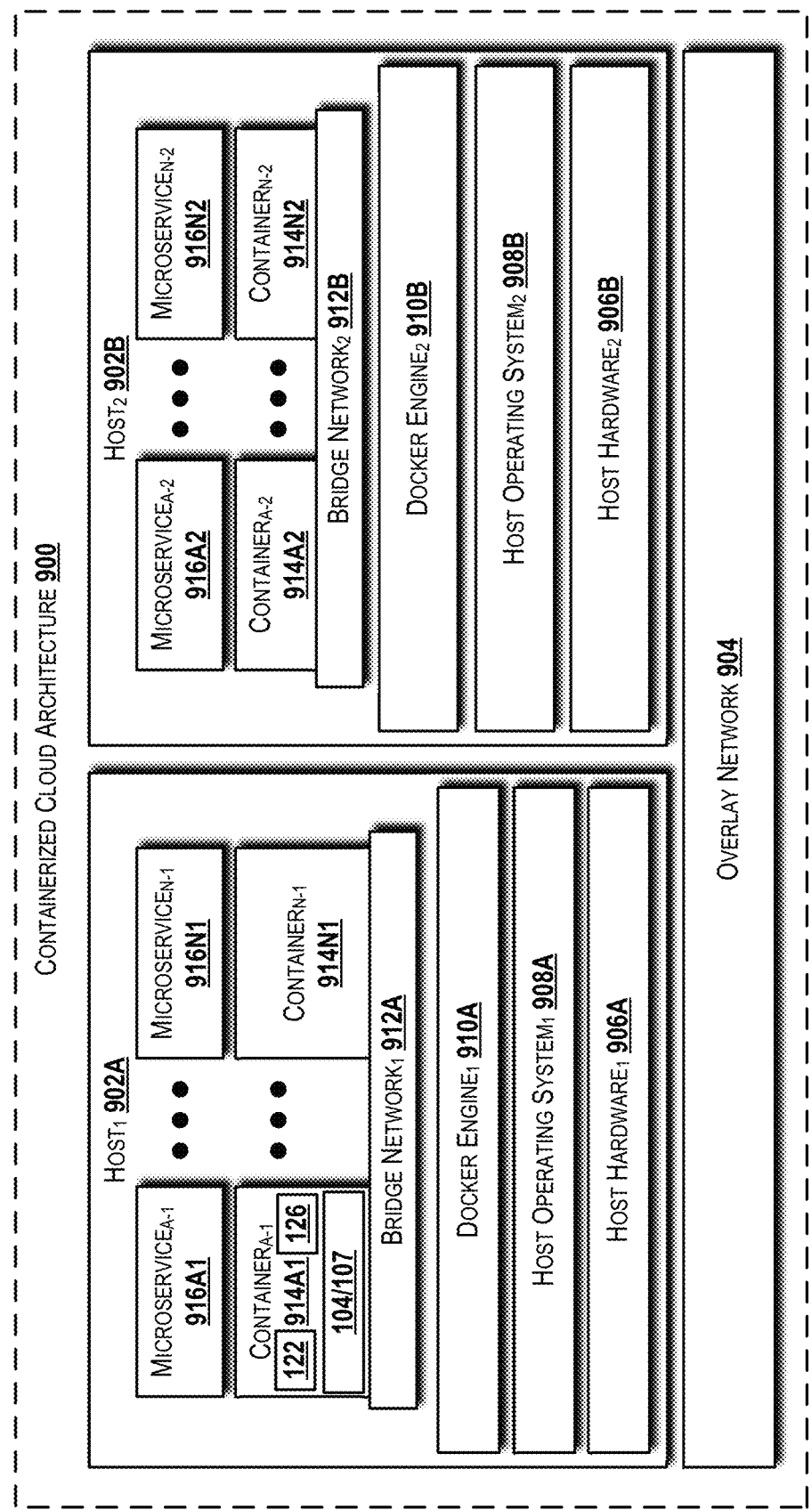
FIG. 9 is a block diagram illustrating an example containerized cloud architecture and components thereof capable of implementing aspects of the embodiments presented herein.

The disclosed solution is a software tool that can reside in the same pod as the encoder(s) (i.e., for KUBERNETES deployments in which a pod is one or more KUBERNETES containers; see FIG. 9 for an example containerized cloud architecture). The software tool can cycle through all channels of a given pod to determine if the audio is synchronized with the video. The software tool can ingest a few seconds (e.g., 6-8 seconds) of AV content from a multi-cast source being sent by video providers (i.e., reference AV content), and can compare this reference segment to one segment of encoded AV content to determine if the audio and video are synchronized. The targeted runtime for each channel validation is 30 seconds, although this target may be changed based upon the needs of a given implementation. Moreover, the software tool is designed to run continuously. If a problem occurs, the software tool can report the problem to other platforms that can trigger alarms and perform the appropriate corrective actions to address the problem.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Referring now FIG. 1, a block diagram illustrating an AV synchronization system 100 in which aspects of the concepts and technologies disclosed herein can be implemented will be described. The AV synchronization system 100 can be implemented, at least in part, in a computer system, such as an example computer system 800 that is illustrated and described with reference to FIG. 8. The AV synchronization system 100 alternatively can be implemented, at least in part, in a containerized architecture, such as an example containerized cloud architecture 900 that is illustrated and described herein with reference to FIG. 9. The AV synchronization system 100 can be implemented, at least in part, in a virtualized cloud architecture, such as an example virtualized cloud architecture 1000 that is illustrated and described herein with reference to FIG. 10. Moreover, aspects of the AV synchronization system 100 may be implemented, at least in part, through the use of machine learning technologies, such as via an example machine learning system 1300 that is illustrated and described herein with reference to FIG. 13. Those skilled in the art will appreciate that the AV synchronization system 100 can be deployed in various ways on different architectures based upon the needs of a given implementation. Accordingly, the examples set forth herein should not be construed as being limiting to the manner in which the AV synchronization system 100 is implemented.

Figure 1:
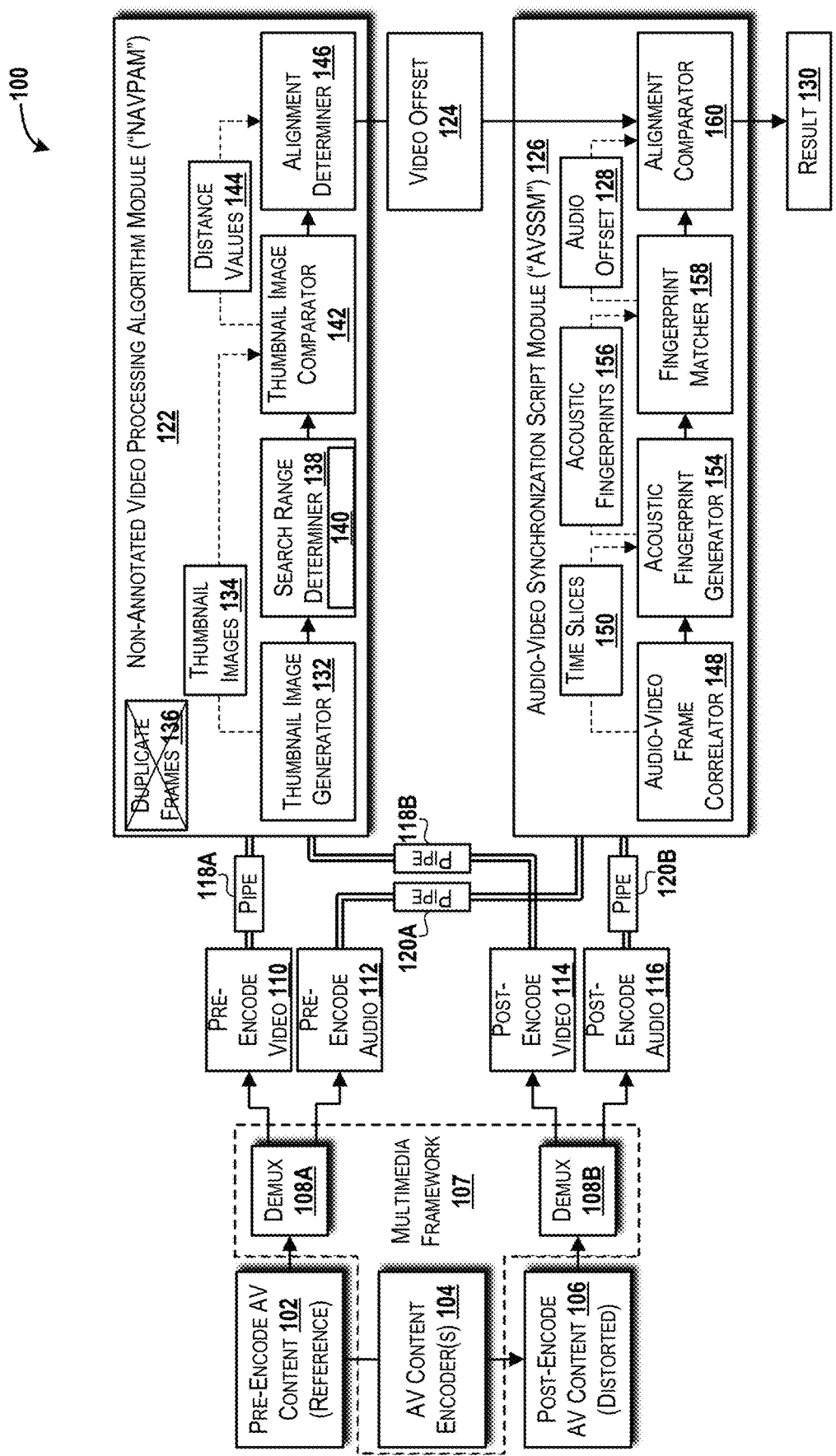
FIG. 1 is a block diagram illustrating an AV synchronization system in which aspects of the concepts and technologies disclosed herein can be implemented.

In the example illustrated in FIG. 1, the AV synchronization system 100 can receive a pre-encode AV content 102

(also referred to herein, at times, as "reference AV content") from a video provider or other source. The pre-encode AV content 102 can be received via a unicast or multi-cast source, although the latter is more likely in many real-world implementations. The pre-encode AV content 102 can include a pre-encode media stream that includes both a reference audio sequence and a reference video sequence (i.e., a reference sequence of audio frames and a reference sequence of video frames) prior to any encoding by one or more AV content encoders 104. In other words, the pre-encode AV content 102 has no change from the original quality, or is the source AV content itself. The AV content encoder(s) 104 can include any audio encoder(s) that utilize any audio codec based on the needs of a video server provider to encode the audio data of the pre-encode AV content 102 prior to distribution. The AV content encoder(s) 104 can include any video encoder(s) that utilize any video codec based on the needs of the video service provider to encode the video data of the pre-encode AV content 102 prior to distribution. The audio and video data portions of the pre-encode AV content 102 are synchronized such that the correct audio frame(s) is played during the correct video frame(s) as intended. It should be understood that the pre-encode AV content 102 can include real-time live streamed content as well as other media such as, but not limited to, video files.

The AV synchronization system 100 can also receive a post-encode AV content 106 (also referred to herein, at times, as "distorted AV content"). The post-encode AV content 106 can include a media stream that includes both a distorted audio sequence and a distorted video sequence (i.e., a distorted sequence of audio frames and a distorted sequence of video frames) after encoding by one or more of the AV content encoders 104. In other words, the post-encode AV content 106 exhibits variance in quality, frame rate, playback delay, or some other alteration from the source AV content. The post-encode AV content 106 can be compared against the reference AV content 102 to establish if a change to the AV synchronization found has occurred post-encode. It should be understood that the post-encode AV content 106 can include real-time live streamed content as well as other media such as, but not limited to, video files.

The subject matter of the reference AV content 102 and the distorted AV content 106 is inconsequential to the fundamental operation of the concepts and technologies disclosed herein. However, those skilled in the art will appreciate the application of the concepts and technologies disclosed herein to certain AV content, such as movies and television shows in which characters may be shown in speaking roles, may benefit more in terms of improving user experience than content in which audio used as an overlay to video such as might be the case of a narrated documentary or the like.

As used herein, a "video frame" is a single second of video data for 1/video-framerate. For example, one video frame for a 29.97 frame-per-second ("FPS") video would be 1/29.97 of that video sequence, or approximately 33.37 milliseconds ("ms") in terms of time. If being rendered, a video frame is the contents of a frame buffer. Video frames are used herein as a proxy for units of time because the output from the disclosed video alignment algorithm (described below) is purely in video frames, which each refer to actual images or frame buffer contents. At 59.94 FPS, the duration of one video frame is approximately 16.67 ms. However, at 29.97 FPS, the duration of one video frame would be twice as long—33.37 ms.

As used herein, an "audio frame" is the data of an audio file (e.g., a .wav file or other audio file) that is rendered once per sample at an audio sampling rate, such as, for example, 44100 Hertz ("Hz"). An audio frame encompasses any sub-frames for each audio channel (e.g., left, right, center, etc.).

Figure 2A:
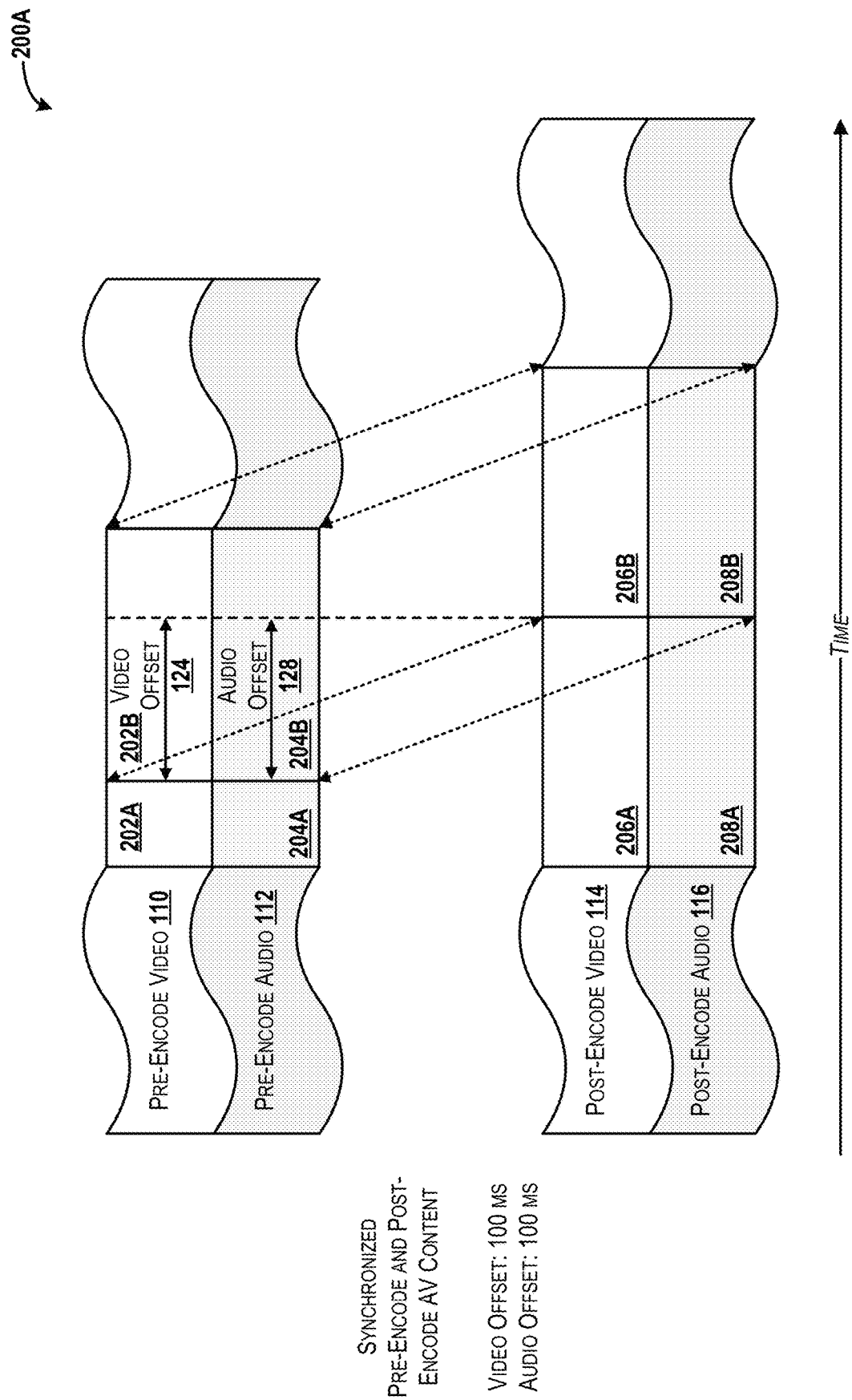
FIG. 2A is a diagram illustrating synchronized pre-encode and post-encode AV content, according to an illustrative embodiment.
Figure 2B:
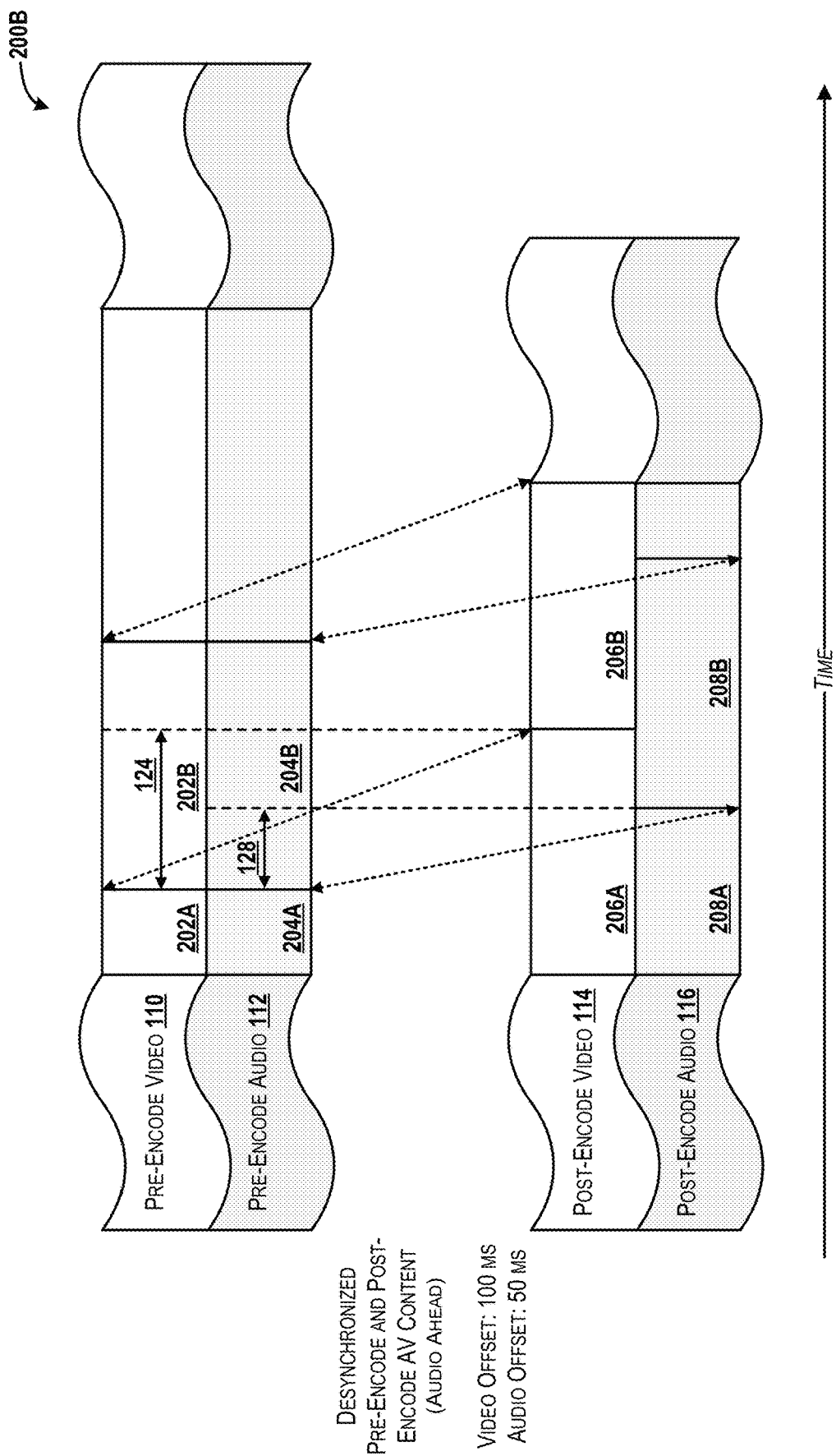
FIG. 2B is a diagram illustrating de-synchronized pre-encode and post-encode AV content with audio ahead of video, according to an illustrative embodiment.
Figure 2C:
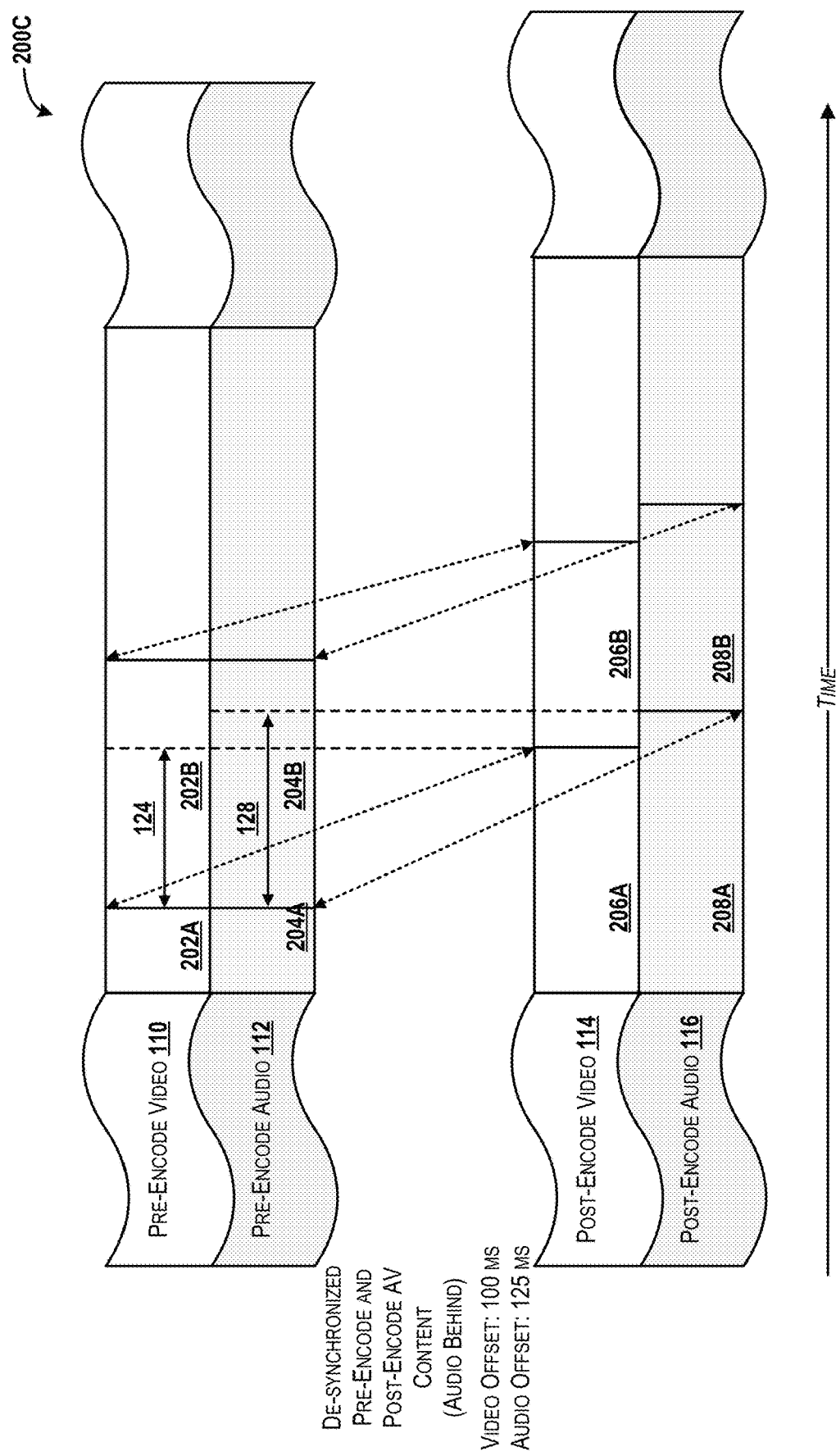
FIG. 2C is a diagram illustrating de-synchronized pre-encode and post-encode AV content with audio behind video, according to an illustrative embodiment.

As used herein, an "alignment" refers to the process of matching two distinct sequences of audio or video on a frame-by-frame basis (examples shown in FIGS. 2A-2C). For video sequences, the matching process is per video frame. For audio sequences, the matching process is based upon the audio data per video frame. For example, if video frame 1 in the distorted video sequence is determined to be equivalent to video frame 100 in the reference video sequence, an alignment is found at that point.

As used herein, a "temporal distance" between aligned points in the reference sequences and the distorted sequences is how far apart the sequences are from playing the same content. The "temporal distance" is also referred to herein as the "offset." When the offset between the reference and distorted audio sequences (i.e., the "audio offset") is not equal to the offset between the reference and distorted video sequences (i.e., the "video offset"), the sequences are referred to as being desynchronized, and the offsets can be used to determine by how much time the sequences are desynchronized.

The reference AV content 102 and the distorted AV content 106 are provided to a multimedia framework 107. The multimedia framework 107 may be proprietary or open-source. By way of example, and not limitation, the multimedia framework 107 can be implemented via FFmpeg, which is a multimedia framework available under the GNU Lesser General Public License ("LGPL") version 2.1 or later and the GNU General Public License ("GPL") version 2 or later. Those skilled in the art will appreciate the applicability of other multimedia frameworks and other software that are capable of performing certain operations described herein. Accordingly, the multimedia framework 107 embodied as FFmpeg should not be construed as being limiting in any way.

The multimedia framework 107 can provide functionality such as decoding, encoding, transcoding, multiplexing, demultiplexing, streaming, filtering, and playback. The multimedia framework 107 can include the AV content encoder(s) 104 as shown, although the AV content encoder(s) 104 may be separate from the multimedia framework 107. In the illustrated embodiment, the multimedia framework 107 streams the pre-encode AV content 102 and the post-encode AV content 106 and performs demultiplexing via demultiplexers 108A, 108B (shown as "demux 108A" and "demux 108B") to separate the audio and video sequences. In particular, the demux 108A can demultiplex the pre-encode AV content 102 to create a pre-encode video sequence (shown as "pre-encode video") 110 and a pre-encode audio sequence (shown as "pre-encode audio") 112. Likewise, the demux 108B can demultiplex the post-encode AV content 106 to create a post-encode video sequence (shown as "post-encode video") 114 and a post-encode audio sequence (shown as "post-encode audio") 116. The demux 108A can output the pre-encode video 110 to a first video pipe ("video pipe$_1$ 118A") and the pre-encode audio 112 to a first audio pipe ("audio pipe$_1$") 120A. The demux 108B can output the post-encode video 114 to a second video pipe ("video pipe$_2$ 118B") and the post-encode audio 116 to a second audio pipe ("audio pipe$_2$") 120B.

The video pipes 118A, 118B can feed into a non-annotated video processing algorithm module ("NAVPAM") 122.

The NAVPAM 122 can analyze two simultaneous video image sequence captures of the same content, such as the pre-encode video 110 and the post-encode video 114. The NAVPAM 122 addresses the complex problem of divergent video content alignment. The output of the NAVPAM 122 is a video offset 124. The video offset 124 is equivalent to the temporal distance between aligned points in the pre-encode video 110 and the post-encode video 114.

The audio pipes 120A, 120B can feed into an audio/video synchronization script module ("AVSSM") 126. The AVSSM 126 can generate an audio offset 128. The AVSSM 126 can compare the video offset 124 to the audio offset 128 to determine an AV synchronization evaluation result (shown as "result") 130. The result 130 indicates whether or not the post-encode AV content 106 (i.e., distorted) is correctly synchronized with the pre-encode AV content 102 (i.e., reference). Additional details in this regard will be described herein.

The NAVPAM 122 and the AVSSM 126 can be separate software modules as illustrated or can be combined into one software module. The NAVPAM 122 and/or the AVSSM 126 can be implemented in hardware such as via a field-programmable gate array ("FPGA"). The operations performed by the NAVPAM 122 and the AVSSM 126 will be described separately, but it should be understood that these operations may be performed by the NAVPAM 122 and the AVSSM 126 simultaneously.

The illustrated NAVPAM 122 includes a plurality of sub-modules that perform various functions. The NAVPAM 122 is illustrated in this manner for ease of explanation. In practice, the NAVPAM 122 can combine the functionality of the sub-modules. Alternatively, each of the plurality of sub-modules can be a standalone software module, the output of which can be used as input for the next sub-module such as in the flow shown in the illustrated example.

The NAVPAM 122 includes a thumbnail image generator 132 that receives the pre-encode video 110 and the post-encode video 114 via respective video pipes 118A, 118B, and processes the pre-encode video 110 and the post-encode video 114 into thumbnail images 134 that are suitable for processing. The thumbnail images 134 (also referred to as "binary" or "bi-tonal" images) are lower-resolution images with a color space that has been compressed from a 24-bit channel representation per pixel to a single bit. This results in an image that can be delineated with two colors, with the value of each pixel being either 1 or 0. The thumbnail image generator 132 also can discard any duplicate frames 136. The thumbnail image generator 132 can provide the thumbnail images 134 to a search range determiner 138.

The search range determiner 138 can determine a plurality of search ranges 140 that can be used to perform an iterative search for a first alignment point between the pre-encode video 110 and the post-encode video 114. This determination can be based upon one or more search parameters that define the granularity of the search. Additional details about two search strategies will be described below.

The NAVPAM 122 also includes a thumbnail image comparator 142. The thumbnail image comparator 142 compares pairs of the thumbnail images 134 and determines a distance value 144 for each comparison. The thumbnail image comparator 142 provides the distance values 144 to an alignment determiner 146. The alignment determiner 146 analyzes the distance values 144 to determine an alignment where the distance between the thumbnail images 134 is minimized and outputs the video offset 124.

The illustrated AVSSM 126 includes a plurality of sub-modules that perform various functions. The AVSSM 126 is illustrated in this manner for ease of explanation. In practice, the AVSSM 126 can combine the functionality of the sub-modules. Alternatively, each of the plurality of sub-modules can be a standalone software module, the output of which can be used as input for the next sub-module such as in the flow shown in the illustrated example.

The AVSSM 126 receives the pre-encode audio 112 and the post-encode audio 116 via the audio pipes 120A, 120B, respectively. The AVSSM 126 includes an audio-video frame correlator 148 that divides the pre-encode audio 112 and the post-encode audio 116 into time slices 150, wherein each time slice 150 is associated with a corresponding video frame. The audio-video frame correlator 148 outputs the time slices 150 to an acoustic fingerprint generator 154. The acoustic fingerprint generator 154 generates acoustic fingerprints 156 from the time slices 150. In some embodiments, the acoustic fingerprint generator 154 utilizes open source fingerprint extraction software, such as, for example, Chromaprint (available from the Acousticid project). Other software, including proprietary software can also be used to generate the acoustic fingerprints 156. The acoustic fingerprints 156 can be used to quickly identify portions of the pre-encode audio 112 and the post-encode audio 116 during the time slices 150.

The AVSSM 126 also includes a fingerprint matcher 158. The fingerprint matcher 158 can compare the acoustic fingerprints 156 between frames for similarity. In some embodiments, the fingerprint matcher 158 utilizes fuzzy string matching. Many programming languages have well-developed libraries that provide fuzzy string matching functionality. One such library is FuzzyWuzzy for Python. FuzzyWuzzy uses Levenshtein distance to correlate two fingerprints, such as the acoustic fingerprints 156, and return a score from 0-100 that represents how close the fingerprints are. In testing, the acoustic fingerprints 156 that score 90-100 are viable and scores 80 and below can yield inaccurate alignment results. Other fuzzy string matching software may require further tweaking to obtain accurate alignment results. Although FuzzyWuzzy is described herein, other solutions that provide fuzzy string matching can be implemented without departing from the scope of this disclosure. The output of the fingerprint matcher 158 is the audio offset 128 in video frame numbers. Since the video offset 124 and the audio offset 128 are both known and utilize video frame numbers as a common metric, the video offset 124 and the audio offset 128 can be compared to determine whether or not the post-encode (distorted) AV content 106 is correctly synchronized with the pre-encode (reference) AV content 102, which an alignment comparator 160 can output as the result 130.

Although the NAVPAM 122, the AVSSM 126, and the various sub-modules thereof are described separately and sequentially, it should be understood that the operations performed by the NAVPAM 122 and the AVSSM 126 can be conducted in parallel and likely will be conducted parallel in real-world implementations. Accordingly, any particular order used to describe the operations performed by the NAVPAM 122 and the AVSSM 126 should not be construed as being limiting in any way. Moreover, additional details of the operations performed by the NAVPAM 122 and the AVSSM 126 will become apparent to those skilled in the art from the description of the remaining FIGURES.

Turning now to FIG. 2A, a synchronization diagram 200A illustrating example sequences of the pre-encode AV (reference) content 102 and the post-encode (distorted) AV content 106 in synchronization will be described, according to an illustrative embodiment. The pre-encode video 110 includes multiple reference video frames 202A, 202B (collectively "reference video frames 202"). Although only two reference video frames 202A, 202B are illustrated, the pre-encode video 110 can contain any number of reference video frames 202. The pre-encode audio 112 includes multiple reference audio frames 204A, 204B (collectively "reference audio frames 204"). Although only two reference audio frames 204A, 204B are illustrated, the pre-encode audio 112 can contain any number of reference audio frames 204. The post-encode video 114 includes multiple distorted video frames 206A, 206B (collectively "distorted video frames 206"). Although only two distorted video frames 206A, 206B are illustrated, the post-encode video 114 can contain any number of distorted video frames 206. The post-encode audio 116 includes multiple distorted audio frames 208A, 208B (collectively "distorted audio frames 208"). Although only two distorted audio frames 208A, 208B are illustrated, the post-encode audio 116 can contain any number of distorted audio frames 208.

The synchronization diagram 200A also illustrates an alignment between the reference video frame 202B and the distorted video frame 206B with a video offset 124 of 100 milliseconds ("ms"). The synchronization diagram 200A also illustrates an alignment between the reference audio frame 204B and the distorted audio frame 208B with an audio offset 128 of 100 ms. When the video offset 124 between the pre-encode video 110 and the post-encode video 114 is the same as the audio offset 128 between the pre-encode audio 112 and the post-encode audio 116, the audio playing at each of the pre-encode video frames 202 is the same audio playing at the corresponding distorted video frames 206. Even if the alignment is not perfect, so long as the difference between the video offset 124 and the audio offset 128 is small enough to be virtually imperceptible to users, the pre-encode AV content 102 and the post-encode AV content 106 can be considered synchronized as shown in the synchronization diagram 200A.

Desynchronization is defined herein as when the audio offset 128 is not equal to the video offset 124. If the difference between the audio offset 128 and the video offset 124 is sufficiently large, the desynchronization can be perceptible to users and can be verified by observing lip sync issues during playback. If the audio offset 128 is less than the video offset 124, then the audio is played after it is supposed to (i.e., the audio is ahead of the video). If the audio offset 128 is more than the video offset 124, then the audio is played before it is supposed to (i.e., the audio is behind the video). Both of these scenarios can be identified as desynchronization. For example, if a pre-encode capture is 100 ms ahead of a post-encode, then the audio for the pre-encode capture should be 100 ms ahead of the post-encode capture, and the video for the pre-encode capture should be 100 ms ahead of the post-encode capture. If these two offsets are different, such as, for example, the pre-encode video is ahead 100 ms, but the pre-encode audio is 125 ms ahead, then the audio and video have de-synchronized by 25 ms.

It should be understood that the International Telecommunications Union ("ITU") has provided a recommendation for the relative timing of sound and vision for broadcasting (ITU-R BT.1359-1). What constitutes a perceptible time difference between the audio offset 128 and the video offset 124 can be determined based upon the foregoing ITU recommendation.

Turning now to FIG. 2B, a desynchronization diagram 200B illustrating example sequences of the pre-encode AV (reference) content 102 and the post-encode (distorted) AV content 106 in desynchronization will be described, according to an illustrative embodiment. The example shown in FIG. 2B illustrates when the audio is played before it is supposed to, which can occur when the audio offset 128 between the post-encode audio 116 and the pre-encode audio 112 is smaller than the video offset 124 between the post-encode video 114 and the pre-encode video 110.

Turning now to FIG. 2C, another desynchronization diagram 200C illustrating example sequences of the pre-encode AV (reference) content 102 and the post-encode (distorted) AV content 106 in desynchronization will be described, according to an illustrative embodiment. The example shown in FIG. 2C illustrates when the audio is played after it is supposed to, which can occur when the audio offset 128 between the post-encode audio 116 and the pre-encode audio 112 is larger than the video offset 124 between the post-encode video 114 and the pre-encode video 110.

Figure 3:
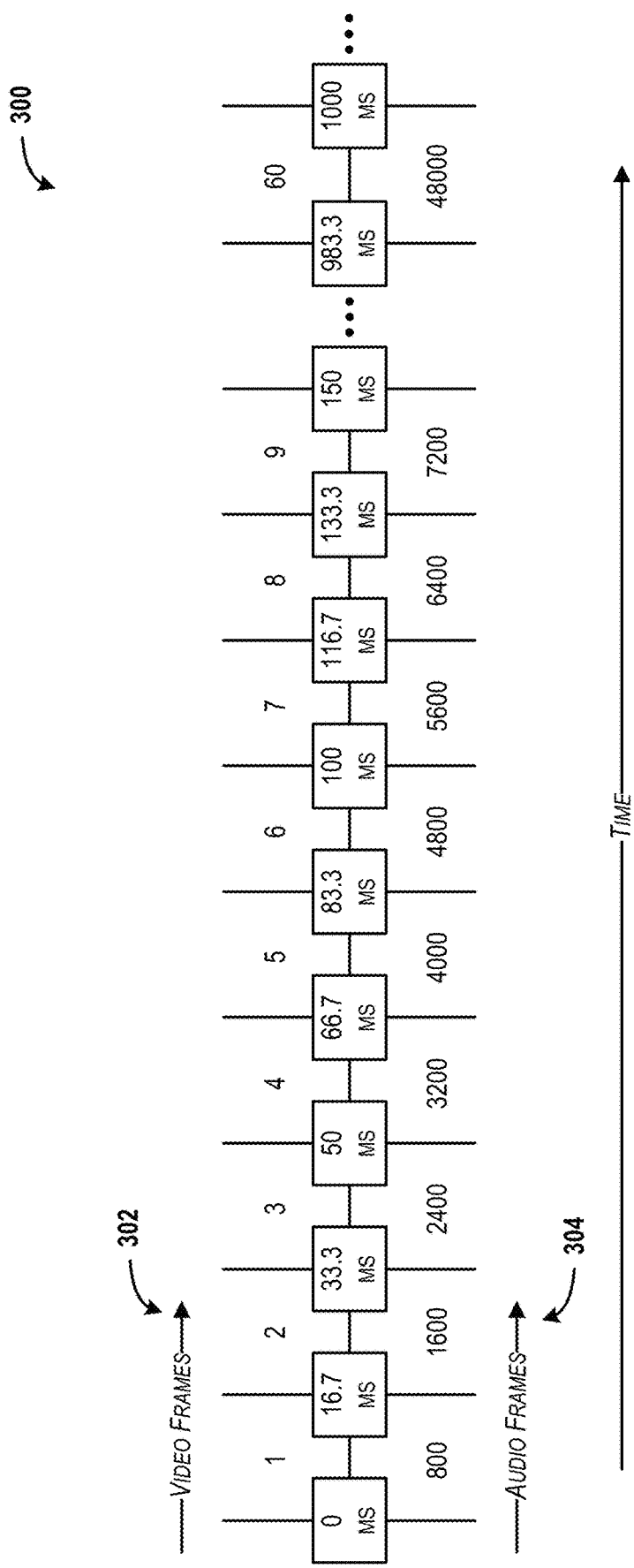
FIG. 3 is a diagram illustrating an example translation of audio frames to video frames, according to an illustrative embodiment.

Conventionally, video alignment is reconciled in terms of video frames instead of elapsed time (e.g., minutes, seconds, milliseconds, etc.). Video frames function as a proxy for time or temporal displacement and can be converted back and forth between elapsed time by dividing video frames by the video frame rate (assumed constant) of the capture. Similarly, audio data can be reconciled in a congruent manner; but instead of video frame rate, the audio frame rate is the sampling rate. The number of audio frames per second in an audio file sampled at 48 kilohertz ("kHz") is 48,000. If the corresponding video is captured at 60 frames per second, then it can be determined that approximately every 800 frames of audio would correspond to one frame of video (i.e., 48000/60=800). Turning to FIG. 3, a diagram 300 illustrates this concept. In particular, FIG. 3 illustrates video frames 302 from video frame 1 to video frame 60 and corresponding audio frames 304 from 800 to 48,000 in increments of 800.

For each video frame in the post-encode video 114, an index of the audio frame ("ax") can be extrapolated for video frame ("N") as a function of the video frame rate ("vFPS") and the audio sampling rate ("aSR"):

$$ax = N \cdot \frac{aSR}{vFPS}.$$

where the amount of audio frames ("aL") is equal to the fingerprint size ("vFP") in video frames:

$$aL = \frac{aSR}{vFPS} \cdot vFP.$$

Thus, for example, if it is desired to obtain audio data at video frame 100, where the video frame rate is 59.97 FPS, the audio sampling rate is 48000 Hz, and the size of the fingerprint is 164 video frames, then:

$$ax = 100 \cdot \frac{48000 \text{ Hz}}{59.97 fps} = 80040.02$$

and $$aL = \frac{48000 \text{ Hz}}{59.97 fps} \cdot 164 = 131265.63.$$

The fractional portion of the values can be discarded because these values are not valid indices. Thus, at audio frame 80040, 131265 frames are retrieved for the fingerprint.

Fuzzy string matching can be used to compare fingerprint data. Many programming languages have well-developed libraries that provide fuzzy string matching functionality. One such library is FuzzyWuzzy for Python. FuzzyWuzzy uses Levenshtein distance to correlate two fingerprints and return a score from 0-100 that represents how close the fingerprints are. In testing, fingerprints that score 90-100 are viable and scores 80 and below can yield inaccurate alignment results. Other fuzzy string matching software may require further tweaking to obtain accurate alignment results. Although FuzzyWuzzy is described herein, other solutions that provide fuzzy string matching can be implemented without departing from the scope of this disclosure.

Because the present disclosure aligns the post-encode AV content 106 and the pre-encode AV content 102 based on video frame number, the granularity of a search through the audio frame data is equal to the audio sampling rate divided by the video frame rate. In the previous example, at a sampling rate of 48 kHz and a video frame rate of 60 FPS, the granularity of the search through the audio data was 800 frames wide. There are two search strategies to find the first alignment point: iterative search and hashing fingerprints. Iterative search will now be described.

Figures 4A, 4B:
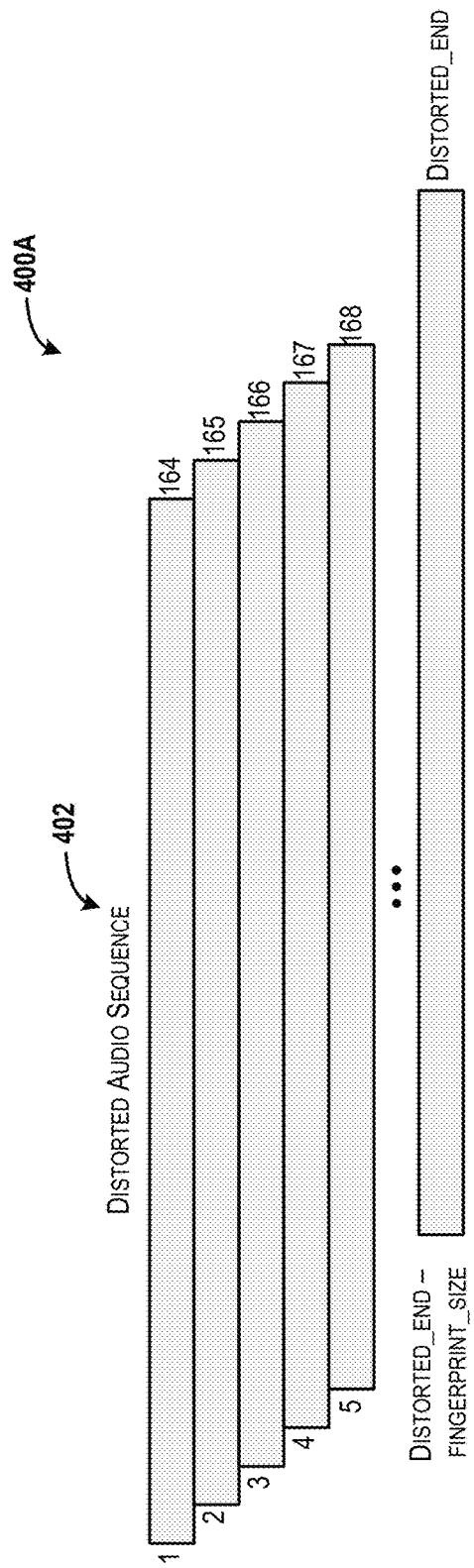
FIGS. 4A and 4B are diagrams illustrating an example of a micro-iteration iterative search, according to an illustrative embodiment.

Turning now to FIGS. 4A and 4B, diagrams 400A, 400B illustrating an example of a micro-iteration iterative search will be described, according to an illustrative embodiment. As used herein, "micro-iteration" and "macro-iteration" are used to differentiate iterative searches based on different step sizes in terms of frames. Performing an exhaustive search is slow, but has the advantage of being simple to implement and also suitable, if not ideal, for parallelization. In the example shown in FIG. 4A, the diagram 400A illustrates a distorted audio sequence 402, such as the distorted audio 116. In the example shown in FIG. 4B, the diagram 400B illustrates a reference audio sequence 404. The distorted audio sequence 402 and the reference audio sequence 404 have a fingerprint size of 164.

Due to the computational complexity upper-bound in the worst-case, the search range in this example is limited to max_search_range of 800 video frames (i.e., 13.3 seconds at 60 FPS) for the following example:

| Iteration | Distorted Range | Reference Range |
|---|---|---|
| 1 | 1-164 | 1-164 |
| 2 | 1-164 | 2-165 |
| 3 | 1-164 | 3-166 |
| 4 | 1-164 | 4-167 |
| 5 | 1-164 | 5-168 |
| ... | ... | ... |
| 800 | 1-164 | 800-964 |
| 801 | 2-165 | 1-164 |
| 802 | 2-165 | 2-165 |
| 803 | 2-165 | 3-166 |

Fingerprints can then be generated for the two ranges being compared, and the correlation score can be compared. If a match is found, the search can end short of reaching the max_search_range. Micro-iteration can be terminated and the process can proceed to macro-iteration. After macro-iteration, the process can be repeated to find the next alignment point past the ranges through which macro-iteration occurred. Since iterating over the audio sequence tends to retrieve the same set of audio data from the reference sequence (i.e., iteration 1 and 801 access the same reference data), caching this data can improve performance.

In the worst case, both audio sequences will be 100% different, and the entire reference sequence should be iteratively searched. This could potentially be rectified by generating and comparing two fingerprints for the entirety of each sequence, and using the correlation score to determine if it would be worth attempting to align the audio sequences.

Figure 5:
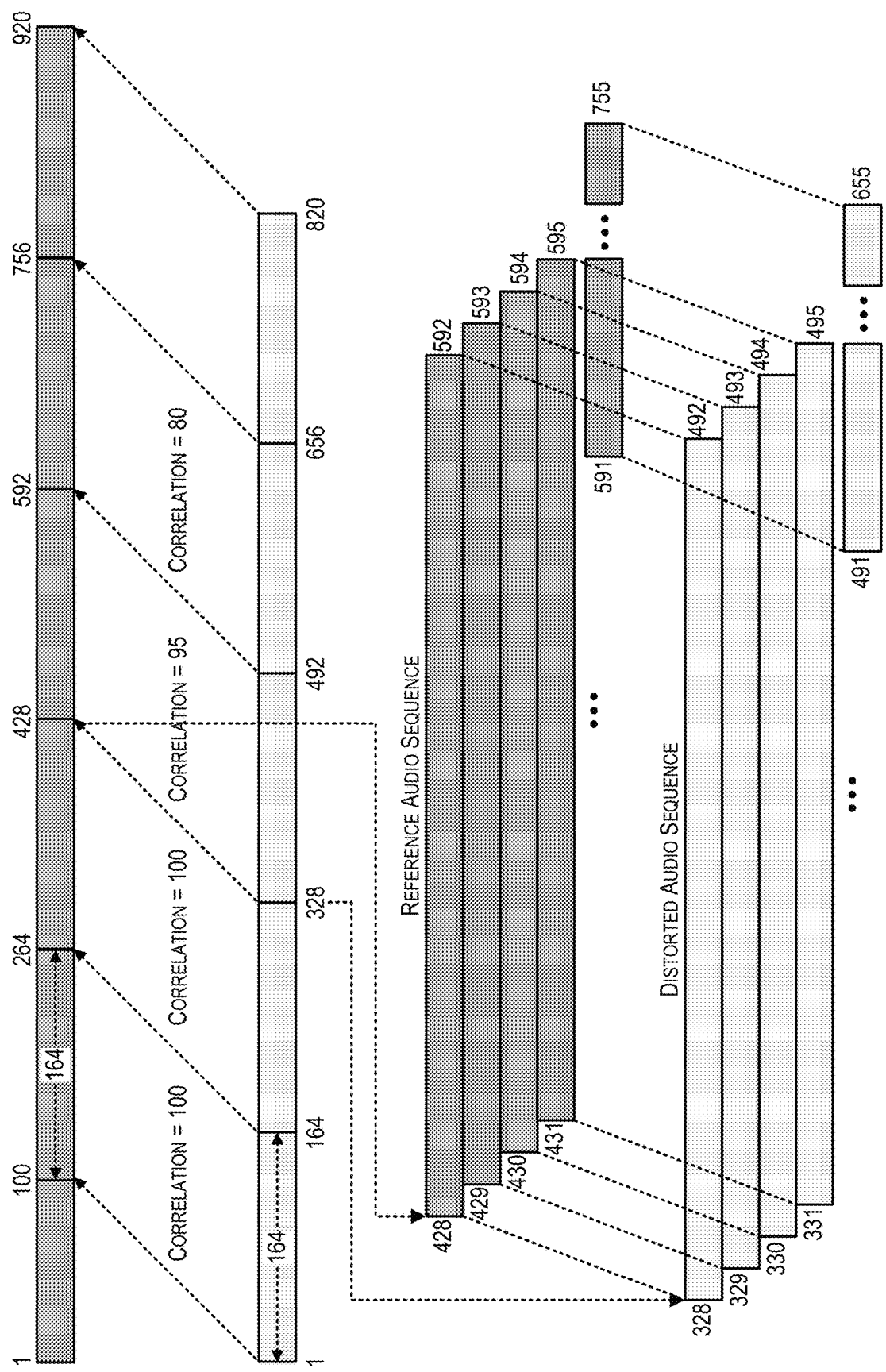
FIG. 5 is a diagram illustrating an example of a macro-iteration iterative search, according to an illustrative embodiment.

After finding the first alignment point, the iterative search can continue by stepping through the distorted and reference audio sequences, where each step size is the number of video frames that is set for the fingerprint size. Here, the assumption is that because the playback rates for the distorted and reference audio data are the same and that no stalls are introduced into the audio data, once an offset is established through finding the first alignment, the remainder of the sequences should be aligned. This greatly reduces the search space by a factor equal to the fingerprint size. However, while macro iterating, when the two supposedly aligned samples do not satisfy the correlation threshold, macro-iteration can be stopped and micro-iteration can begin at the last known sample position above the correlation threshold (e.g., 95). In the example shown in FIG. 5, if a first alignment point is found for distorted frame 1 at reference frame 100 with a correlation score of 100, then macro-iteration in steps of the fingerprint size (i.e., 164) would commence.

| Macro-Iteration | Distorted Range | Reference Range | Correlation |
|---|---|---|---|
| 1 | 1-164 | 100-264 | 100 |
| 2 | 164-328 | 264-428 | 100 |
| 3* | 328-492 | 428-592 | 95 |
| 4 | 492-656 | 592-756 | 80 |

Because the correlation in iteration 4 is beneath the correlation threshold of 95, the process returns to the previous iteration, iteration 3, and proceeds to check frame-by-frame for the last range where the correlation between fingerprints meets the correlation threshold. For example:

| Micro-Iteration | Distorted Range | Reference Range | Correlation |
|---|---|---|---|
| 1 | 329-493 | 429-593 | 98 |
| 2 | 330-494 | 430-594 | 96 |
| 3 | 331-495 | 431-595 | 9 |
| ... | ... | ... | <95 |
| 163 | 491-655 | 591-755 | 81 |

In the example above, there are no correlation scores 95 or greater from micro-iteration 3-163. Since the last sufficient correlation found is at micro-iteration 3, the macro-interaction process can be concluded. The process can then return to finding the next alignment point for the next sample (i.e., distorted range 332-496), in the reference sequence where the correlation score is greater than or equal to the correlation threshold.

Figure 6:
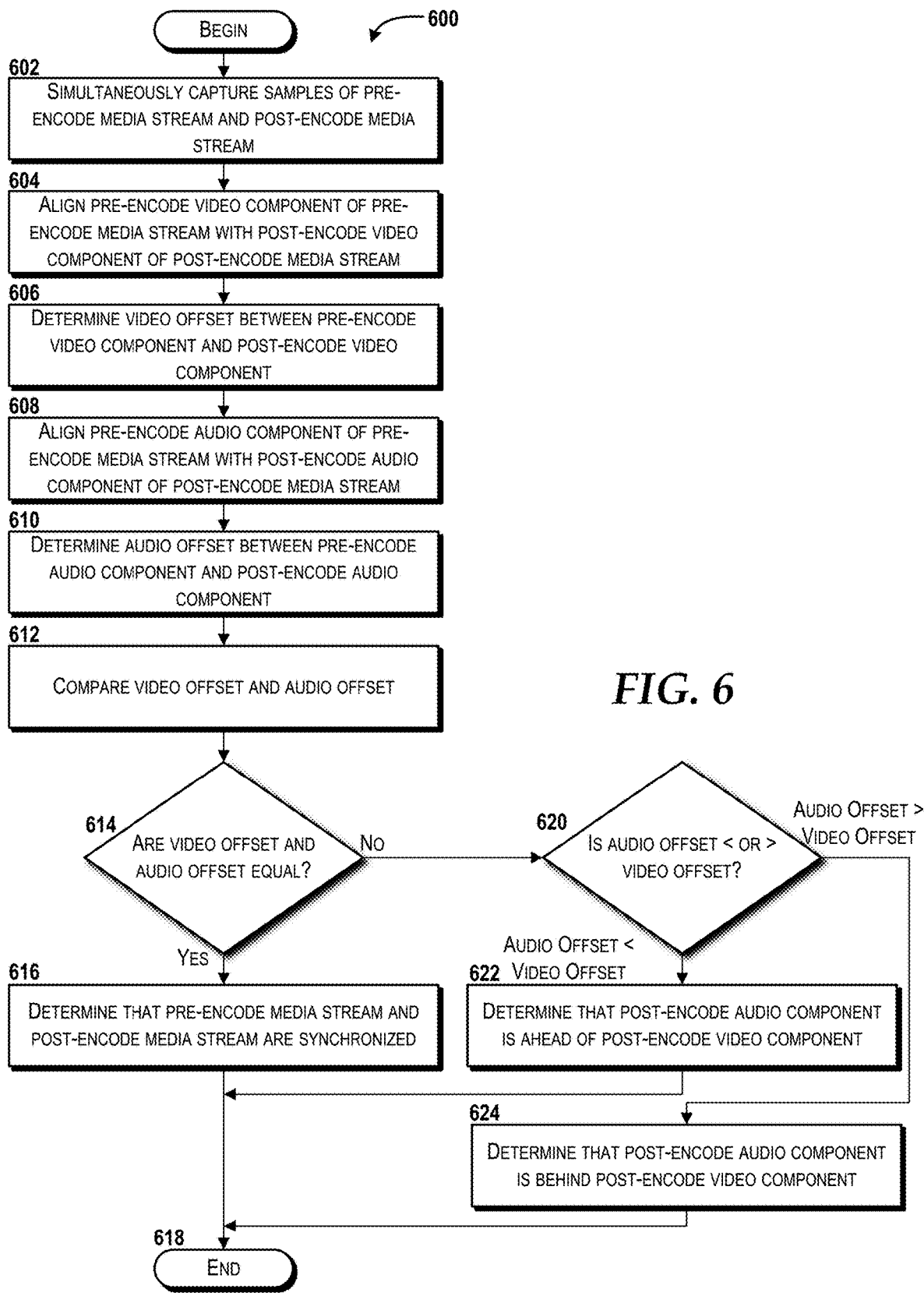
FIG. 6 is a flow diagram illustrating aspects of a method for determining whether pre-encode and post-encode media streams are synchronized, according to an illustrative embodiment.

Turning now to FIG. 6, a method 600 for determining whether pre-encode and post-encode media streams, such as the pre-encode AV content 102 and the post-encode AV content 106, are synchronized will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor or multiple processors of one or more systems and/or one or more devices disclosed herein to perform one or more operations and/or causing the processor to direct other components of the computing system or device to perform one or more of the operations.

The method 600 begins and proceeds to operation 602. At operation 602, the AV synchronization system 100 simultaneously captures samples of a pre-encode media stream (e.g., the pre-encode AV content 102) and a post-encode media stream (e.g., the post-encode AV content 106). From operation 602, the method 600 proceeds to operation 604. At operation 604, the AV synchronization system 100, via execution of the NAVPAM 122, aligns a pre-encode video component of the pre-encode media stream (e.g., the pre-encode video 110) with a post-encode video component of the post-encode media stream (e.g., the post-encode video 114). From operation 604, the method 600 proceeds to operation 606. At operation 606, the AV synchronization system 100, via execution of the NAVPAM 122, determines a video offset (e.g., the video offset 124) between the pre-encode video component (e.g., the pre-encode video 110) and the post-encode video component (e.g., the post-encode video 114).

From operation 606, the method 600 proceeds to operation 608. At operation 608, the AV synchronization system 100, via execution of the AVSSM 126, aligns a pre-encode audio component of the pre-encode media stream (e.g., the pre-encode audio 112) with a post-encode audio component of the post-encode media stream (e.g., the post-encode audio 116). From operation 608, the method 600 proceeds to operation 610. At operation 610, the AV synchronization system 100, via execution of the AVSSM 126, determines an audio offset (e.g., the audio offset 128) between the pre-encode audio component (e.g., the pre-encode audio 112) and the post-encode audio component (e.g., the post-encode audio 116).

From operation 610, the method 600 proceeds to operation 612. At operation 612, the AV synchronization system 100, via execution of the AVSSM 126, compares the video offset 124 and the audio offset 128. From operation 612, the method 600 proceeds to operation 614. At operation 614, the AV synchronization system 100, via execution of the AVSSM 126, determines, based upon the comparison at operation 612, whether the video offset 124 and the audio offset 128 are equal. If the AV synchronization system 100 determines that the video offset 124 and the audio offset 128 are equal, the method 600 proceeds to operation 616. At operation 616, the AV synchronization system 100 determines that the pre-encode media stream (e.g., the pre-encode AV content 102) and the post-encode media stream (e.g., the post-encode AV content 106) are synchronized. From operation 616, the method 600 proceeds to operation 618. The method 600 can end at operation 618. Returning to operation 614, if the AV synchronization system 100 determines that the video offset 124 and the audio offset 128 are not equal, the method 600 proceeds to operation 620.

At operation 620, the AV synchronization system 100 determines whether the audio offset 128 is less than (<) or greater than (>) the video offset 124. If the audio offset 128 is less than the video offset 124, the method 600 proceeds to operation 622. At operation 622, the AV synchronization system 100 determines that the post-encode audio component (e.g., the post-encode audio 116) is ahead of the post-encode video component (e.g., the post-encode video 114), which is representative of the pre-encode AV content 102 and the post-encode AV content 106 being desynchronized with the audio being played before the video. From operation 622, the method 600 proceeds to operation 618. The method 600 can end at operation 618. Returning to operation 620, if the audio offset 128 is greater than the video offset 124, the method 600 proceeds to operation 624. At operation 624, the AV synchronization system 100 determines that the post-encode audio component (e.g., the post-encode audio 116) is behind of the post-encode video component (e.g., the post-encode video 114), which is representative of the pre-encode AV content 102 and the post-encode AV content 106 being desynchronized with the audio being played after the video. The method 600 then proceeds to operation 618. The method 600 can end at operation 618.

Figure 7:
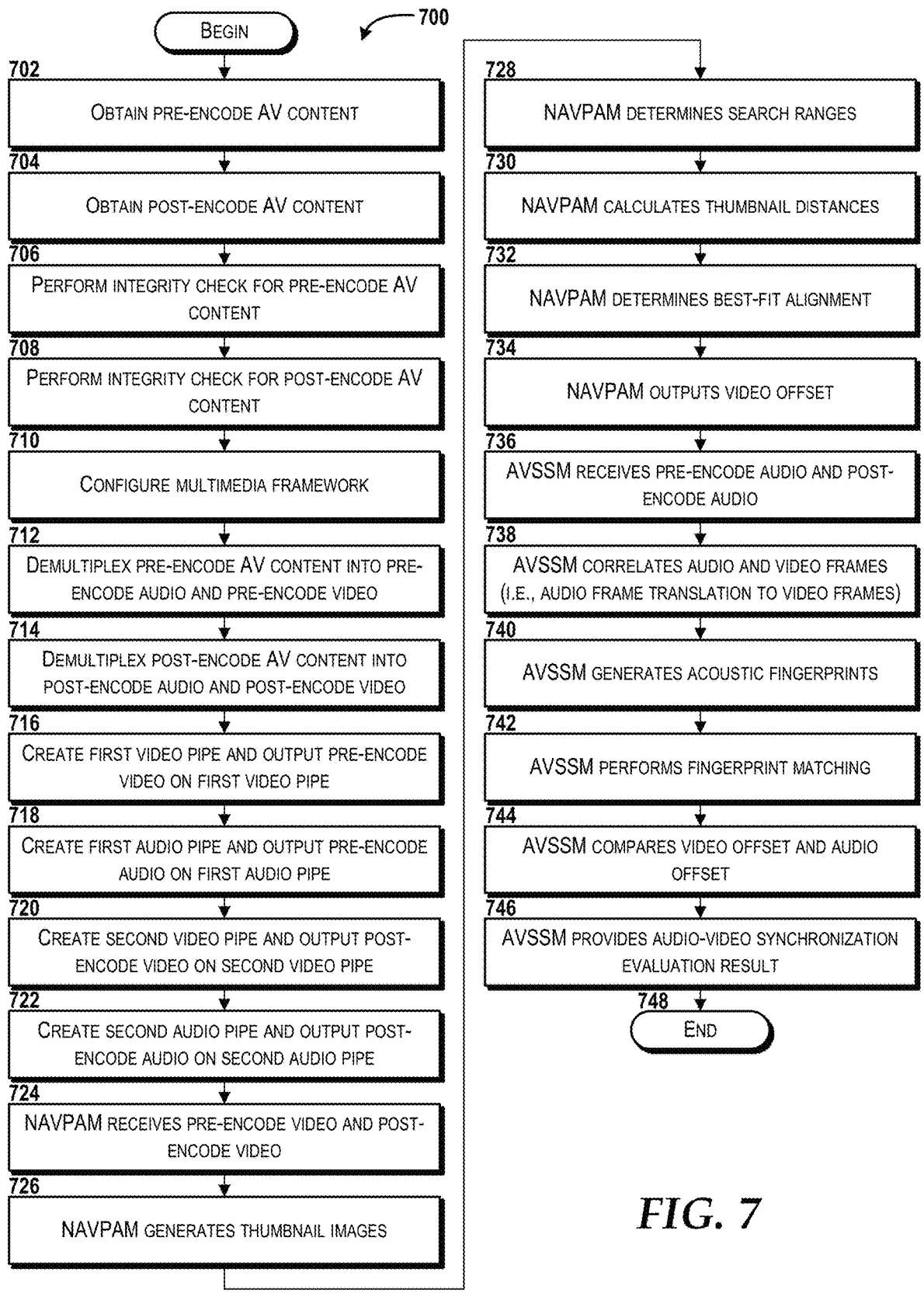
FIG. 7 is a flow diagram illustrating aspects of another method for determining whether pre-encode and post-encode media streams are synchronized, according to an illustrative embodiment.

Turning now to FIG. 7, a method 700 for determining whether pre-encode and post-encode media streams, such as the pre-encode AV content 102 and the post-encode AV content 106, are synchronized will be described, according to an illustrative embodiment. The method 700 begins and proceeds to operation 702. At operation 702, the AV synchronization system 100 receives the pre-encode AV content 102. From operation 702, the method 700 proceeds to operation 704. At operation 704, the AV synchronization system 100 obtains the post-encode AV content 106. From operation 704, the method 700 proceeds to operation 706. At operation 706, the AV synchronization system 100 uses the multimedia framework 107 to perform an integrity check for the pre-encode AV content 102. From operation 707, the method 700 proceeds to operation 708. At operation 708, the AV synchronization system 100 uses the multimedia framework 107 to perform an integrity check for the post-encode AV content 106. The remaining operations of the method 700 assume that both the pre-encode AV content 102 and the post-encode AV content 106 pass the integrity checks at operations 706, 708, respectively. If the integrity check for either the pre-encode AV content 102 or the post-encode AV content 106 fails, the multimedia framework 107 can output one or more errors.

From operation 708, the method 700 proceeds to operation 710. At operation 710, the AV synchronization system 100 configures the multimedia framework 107. As noted above, the multimedia framework 107 can provide a broad range of functionality to process multimedia content such as the pre-encode AV content 102 and the post-encode AV content 106. For the purposes of the concepts and technologies disclosed herein, and operation 710 specifically, the AV synchronization system 100 can be configured to create the demultiplexers 108A, 108B. The demultiplexers 108A, 108B are software instructions sets programmed to perform demultiplexing.

From operation 710, the method 700 proceeds to operation 712. At operation 712, the AV synchronization system 100 uses the multimedia framework 107, and in particular, the demultiplexer 108A to demultiplex the pre-encode AV content 102 into the pre-encode video 110 and the post-encode audio 112 streams. From operation 712, the method 700 proceeds to operation 714. At operation 714, the AV synchronization system 100 uses the multimedia framework 107, and in particular, the demultiplexer 108B to demultiplex the post-encode AV content 106 into post-encode video 114 and post-encode audio 116 components (streams).

From operation 714, the method 700 proceeds to operation 716. At operation 716, the AV synchronization system 100 creates the first video pipe 118A and outputs the pre-encode video 110 on the first video pipe 118A towards the NAVPAM 122. From operation 716, the method 700 proceeds to operation 718. At operation 718, the AV synchronization system 100 creates the first audio pipe 120A and outputs the pre-encode audio 112 on the first audio pipe 120A towards the AVSSM 126. From operation 718, the method 700 proceeds to operation 720. At operation 720, the AV synchronization system 100 creates the second video pipe 118B and outputs the distorted video 114 on the second video pipe 118B towards the NAVPAM 122. From operation 720, the method 700 proceeds to operation 722. At operation 722, the AV synchronization system 100 creates the second audio pipe 120B and outputs the post-encode audio 116 on the second audio pipe 120B towards the AVSSM 126.

From operation 722, the method 700 proceeds to operation 724. At operation 724, the NAVPAM 122 receives the pre-encode video 110 and the post-encode video 114. From operation 724, the method 700 proceeds to operation 726. At operation 726, the NAVPAM 122 generates the thumbnail images 134. From operation 726, the method 700 proceeds to operation 728. At operation 728, the NAVPAM 122 determines the search ranges 140. From operation 728, the method 700 proceeds to operation 730. At operation 730, the NAVPAM 122 calculates the distance values 144 between the thumbnail images 134. From operation 730, the method 700 proceeds to operation 732. At operation 732, the NAVPAM 122 determines a best-fit alignment where the distance between the thumbnail images 134 is minimized. From operation 732, the method 700 proceeds to operation 734. At operation 734, the NAVPAM 122 outputs the video offset 124 to the AVSSM 126.

From operation 734, the method 700 proceeds to operation 736. At operation 736, the AVSSM receives the pre-encode audio 112 and the post-encode audio 116. From operation 736, the method 700 proceeds to operation 738. At operation 738, the AVSSM 126 correlates the audio and video frames. In particular, the AVSSM 126 divides the pre-encode audio 112 and the post-encode audio 116 into time slices 150, wherein each time slice 150 is associated with a corresponding video frame.

From operation 738, the method 700 proceeds to operation 740. At operation 740, the AVSSM 126 generates the acoustic fingerprints 156. From operation 740, the method 700 proceeds to operation 742. At operation 742, the AVSSM 126 compares the acoustic fingerprints 156 between frames for similarity and determines the audio offset 128. From operation 742, the method 700 proceeds to operation 744. At operation 744, the AVSSM 126 compares the video offset 125 and the audio offset 128 to determine whether or not the post-encode (distorted) AV content 106 is correctly synchronized with the pre-encode (reference) AV content 102. From operation 744, the method 700 proceeds to operation 746. At operation 746, the AVSSM 126 provides the result 130 of the comparison at operation 744. The result 130 indicates whether or not the post-encode (distorted) AV content 106 is correctly synchronized with the pre-encode (reference) AV content 102.

From operation 746, the method 700 proceeds to operation 748. The method 700 can end at operation 748.

Figure 8:
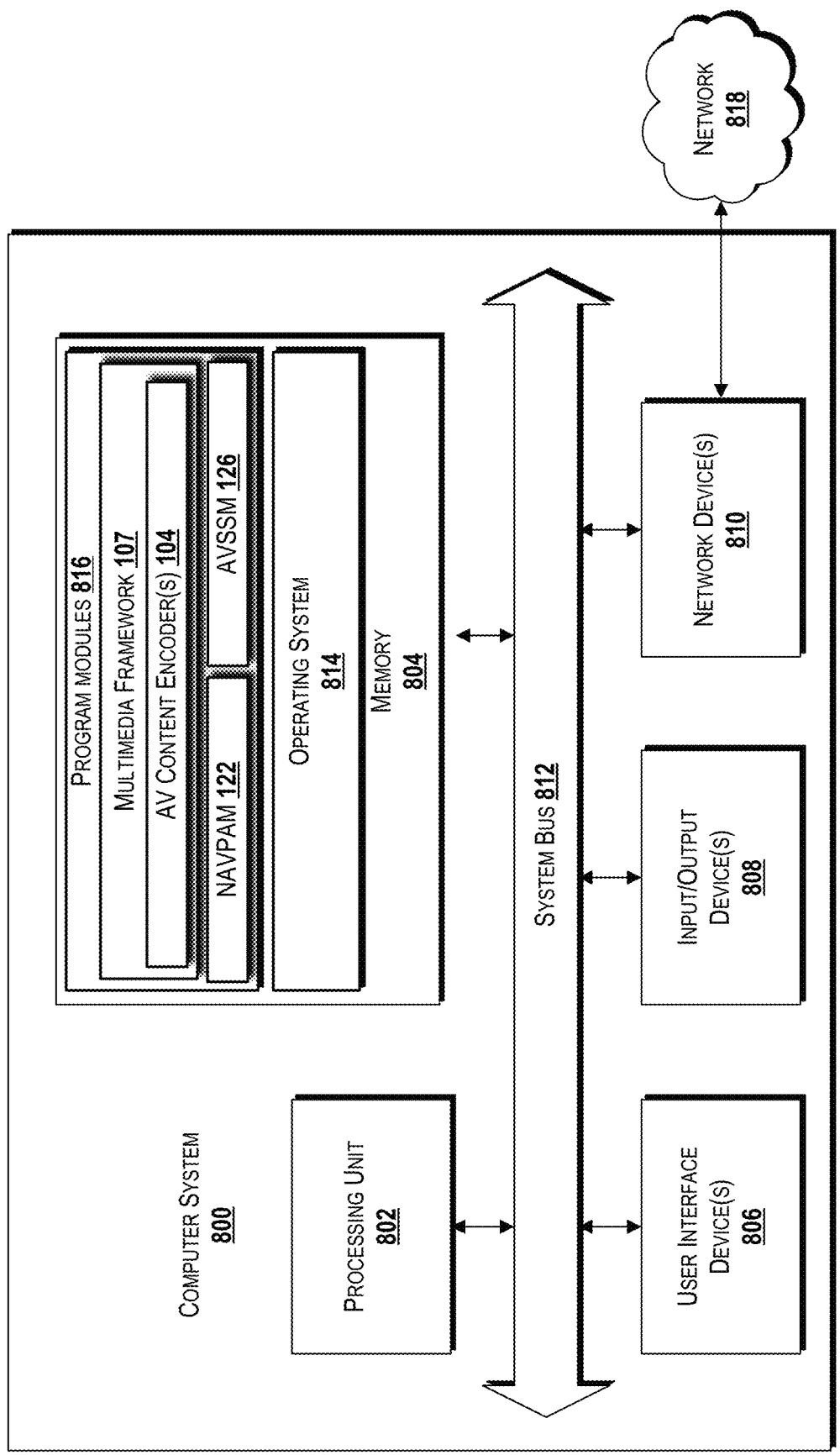
FIG. 8 is a block diagram illustrating an example computer system capable of implementing aspects of the embodiments presented herein.

Turning now to FIG. 8, a block diagram illustrating a computer system 800 configured to provide the functionality described herein for AV synchronization in accordance with various embodiments of the concepts and technologies disclosed herein. In some embodiments, the AV synchronization system 100 is configured the same as or similar to the computer system 800. The computer system 800 includes a processing unit 802, a memory 804, one or more user interface devices 806, one or more input/output ("I/O") devices 808, and one or more network devices 810, each of which is operatively connected to a system bus 812. The bus 812 enables bi-directional communication between the processing unit 802, the memory 804, the user interface devices 806, the I/O devices 808, and the network devices 810.

The processing unit 802 may be a standard central processor that performs arithmetic and logical operations, a more specific purpose programmable logic controller ("PLC"), a programmable gate array, or other type of processor known to those skilled in the art and suitable for controlling the operation of the server computer. The processing unit 802 can be a single processing unit or a multiple processing unit that includes more than one processing component. Processing units are generally known, and therefore are not described in further detail herein.

The memory 804 communicates with the processing unit 802 via the system bus 812. The memory 804 can include a single memory component or multiple memory components. In some embodiments, the memory 804 is operatively connected to a memory controller (not shown) that enables communication with the processing unit 802 via the system bus 812. The memory 804 includes an operating system 814 and one or more program modules 816. The operating system 814 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 816 may include various software and/or program modules described herein. In some embodiments, for example, the program modules 816 can include the multimedia framework 107, the AV content encoder(s) 104, the NAVPAM 122, the AVSSM 126, or a combination thereof. In some embodiments, multiple implementations of the computer system 800 can be used, wherein each implementation is configured to execute one or more of the program modules 816. The program modules 816 and/or other programs can be embodied in computer-readable media containing instructions that, when executed by the processing unit 802, perform the methods 600, 700 described herein. According to embodiments, the program modules 816 may be embodied in hardware, software, firmware, or any combination thereof. Although not shown in FIG. 8, it should be understood that the memory 804 also can be configured to store the pre-encode AV content 102, the post-encode AV content 106, the pre-encode video 110, the pre-encode audio 112, the post-encode video 114, the post-encode audio 116, the thumbnail images 134, the distance values 144, the search ranges 140, the video offset 124, the audio offset 128, the time slices 150, the acoustic fingerprints 156, the result 130, combinations thereof, and/or other data disclosed herein.

By way of example, and not limitation, computer-readable media may include any available computer storage media or communication media that can be accessed by the computer system 800. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 800. In the claims, the phrase "computer storage medium," "computer-readable storage medium," and variations thereof does not include waves or signals per se and/or communication media, and therefore should be construed as being directed to "non-transitory" media only.

The user interface devices 806 may include one or more devices with which a user accesses the computer system 800. The user interface devices 806 may include, but are not limited to, computers, servers, personal digital assistants, cellular phones, or any suitable computing devices. The I/O devices 808 enable a user to interface with the program modules 816. In one embodiment, the I/O devices 808 are operatively connected to an I/O controller (not shown) that enables communication with the processing unit 802 via the system bus 812. The I/O devices 808 may include one or more input devices, such as, but not limited to, a keyboard, a mouse, or an electronic stylus. Further, the I/O devices 808 may include one or more output devices, such as, but not limited to, a display screen or a printer.

The network devices 810 enable the computer system 800 to communicate with other networks or remote systems via a network 818. Examples of the network devices 810 include, but are not limited to, a modem, a radio frequency ("RF") or infrared ("IR") transceiver, a telephonic interface, a bridge, a router, or a network card. The network 818 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 818 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Turning now to FIG. 9, a block diagram illustrating an exemplary containerized cloud architecture 900 capable of implementing, at least in part, aspects of the concepts and technologies disclosed herein will be described, according to an illustrative embodiment. In some embodiments, the AV synchronization system 100, at least in part, is implemented in the containerized cloud architecture 900. In these embodiments, multiple instances of the AV synchronization system 100 can be deployed and executed simultaneously. Each instance of the AV synchronization system 100 can be used to determine a result 130 from different pre-encode AV content 102 and post-encode AV content 106.

The illustrated containerized cloud architecture 900 includes a first host ("host") 902A and a second host ("host") 902B (at times referred to herein collectively as hosts 902 or individually as host 902) that can communicate via an overlay network 904. Although two hosts 902 are shown, the containerized cloud architecture 900 can support any number of hosts 902. The overlay network 904 can enable communication among hosts 902 in the same cloud network or hosts 902 across different cloud networks. Moreover, the overlay network 904 can enable communication among hosts 902 owned and/or operated by the same or different entities.

The illustrated host 902A includes a host hardware$_1$ 906A, a host operating system$_1$ 908A, a DOCKER engine$_1$ 910A, a bridge network$^1$ 912A, container$_{A-1}$ through container$_{N-1}$ 914A1-914N1, and microservice$_{A-1}$ through microservice$_{N-1}$ 916A1-916N1. Similarly, the illustrated host$_2$ 902B includes a host hardware$_2$ 906B, a host operating system$_2$ 908B, a DOCKER engines 910B, a bridge networks 912B, container$_{A-2}$ through container$_{N-2}$ 914A2-914N2, and microservice$_{A-2}$ through microservice$_{N-2}$ 916A2-916N2.

The host hardware$_1$ 906A and the host hardware$_2$ 906B (at times referred to herein collectively or individually as host hardware 906) can be implemented as bare metal hardware such as one or more physical servers. The host hardware 906 alternatively can be implemented using hardware virtualization. In some embodiments, the host hardware 906 can include compute resources, memory resources, and other hardware resources. These resources can be virtualized according to known virtualization techniques. A virtualization cloud architecture 1000 is described herein with reference to FIG. 10. Although the containerized cloud architecture 900 and the virtualization cloud architecture 1000 are described separately, these architectures can be combined to provide a hybrid containerized/virtualized cloud architecture. Those skilled in the art will appreciate that the disclosed cloud architectures are simplified for ease of explanation and can be altered as needed for any given implementation without departing from the scope of the concepts and technologies disclosed herein. As such, the containerized cloud architecture 900 and the virtualized cloud architecture 1000 should not be construed as being limiting in any way.

Compute resources can include one or more hardware components that perform computations to process data and/or to execute computer-executable instructions. For example, the compute resources can execute instructions of the host operating system$_1$ 908A and the host operating system$_2$ 908B (at times referred to herein collectively as host operating systems 908 or individually as host operating system 908), the containers 914A1-914N1 and the containers 914A2-914N2 (at times referred to herein collectively as containers 914 or individually as container 914), and the microservices 916A1-916N1 and the microservices 916A1-916N1 (at times referred to herein collectively as microservices 916 or individually as microservice 916).

The compute resources of the host hardware 906 can include one or more central processing units ("CPUs") configured with one or more processing cores. The compute resources can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources can include one or more discrete GPUs. In some other embodiments, the compute resources can include CPU and GPU components that are configured in accordance with a co-processing CPU/GPU computing model, wherein the sequential part of an application executes on the CPU and the computationally-intensive part is accelerated by the GPU. The compute resources can include one or more system-on-chip ("SoC") components along with one or more other components, including, for example, one or more memory resources, and/or one or more other resources. In some embodiments, the compute resources can be or can include one or more SNAPDRAGON SoCs, available from QUALCOMM; one or more TEGRA SoCs, available from NVIDIA; one or more HUMMINGBIRD SoCs, available from SAMSUNG; one or more Open Multimedia Application Platform ("OMAP") SoCs, available from TEXAS INSTRUMENTS; one or more customized versions of any of the above SoCs; and/or one or more proprietary SoCs. The compute resources can be or can include one or more hardware components architected in accordance with an advanced reduced instruction set computing ("RISC") ("ARM") architecture, available for license from ARM HOLDINGS. Alternatively, the compute resources can be or can include one or more hardware components architected in accordance with an x86 architecture, such an architecture available from INTEL CORPORATION, and others. Those skilled in the art will appreciate the implementation of the compute resources can utilize various computation architectures, and as such, the compute resources should not be construed as being limited to any particular computation architecture or combination of computation architectures, including those explicitly disclosed herein.

The memory resources of the host hardware 906 can include one or more hardware components that perform storage operations, including temporary or permanent storage operations. In some embodiments, the memory resource(s) include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources.

The other resource(s) of the host hardware 906 can include any other hardware resources that can be utilized by the compute resources(s) and/or the memory resource(s) to perform operations described herein. The other resource(s) can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The host operating systems 908 can be proprietary, open source, or closed source. In some embodiments, the host operating systems 908 can be or can include one or more container operating systems designed specifically to host containers such as the containers 914. For example, the host operating systems 908 can be or can include FEDORA COREOS (available from RED HAT, INC), RANCHEROS (available from RANCHER), and/or BOTTLEROCKET (available from Amazon Web Services). In some embodiments, the host operating systems 908 can be or can include one or more members of the WINDOWS family of operating systems from MICROSOFT CORPORATION (e.g., WINDOWS SERVER), the LINUX family of operating systems (e.g., CENTOS, DEBIAN, FEDORA, ORACLE LINUX, RHEL, SUSE, and UBUNTU), the SOLARIS family of operating systems from ORACLE CORPORATION, other operating systems, and the like.

The containerized cloud architecture 900 can be implemented utilizing any containerization technologies. Presently, open-source container technologies, such as those available from DOCKER, INC., are the most widely used, and it appears will continue to be for the foreseeable future. For this reason, the containerized cloud architecture 900 is described herein using DOCKER container technologies available from DOCKER, INC., such as the DOCKER engines 910. Those skilled in the art will appreciate that other container technologies, such as KUBERNETES may also be applicable to implementing the concepts and technologies disclosed herein, and as such, the containerized cloud architecture 900 is not limited to DOCKER container technologies. Moreover, although open-source container technologies are most widely used, the concepts and technologies disclosed here may be implemented using proprietary technologies or closed source technologies.

The DOCKER engines 910 are based on open source containerization technologies available from DOCKER, INC. The DOCKER engines 910 enable users (not shown) to build and containerize applications. The full breadth of functionality provided by the DOCKER engines 910 and associated components in the DOCKER architecture are beyond the scope of the present disclosure. As such, the primary functions of the DOCKER engines 910 will be described herein in brief, but this description should not be construed as limiting the functionality of the DOCKER engines 910 or any part of the associated DOCKER architecture. Instead, those skilled in the art will understand the implementation of the DOCKER engines 910 and other components of the DOCKER architecture to facilitate building and containerizing applications within the containerized cloud architecture 900.

The DOCKER engine 910 functions as a client-server application executed by the host operating system 908. The DOCKER engine 910 provides a server with a daemon process along with application programming interfaces ("APIs") that specify interfaces that applications can use to communicate with and instruct the daemon to perform operations. The DOCKER engine 910 also provides a command line interface ("CLI") that uses the APIs to control and interact with the daemon through scripting and/or CLI commands. The daemon can create and manage objects such as images, containers, networks, and volumes. Although a single DOCKER engine 910 is illustrated in each of the hosts 902, multiple DOCKER engines 910 are contemplated. The DOCKER engine(s) 910 can be run in swarm mode.

The bridge networks 912 enable the containers 914 connected to the same bridge network to communicate. For example, the bridge network$_1$ 912A enables communication among the containers 914A1-914N1, and the bridge network$_2$ 912B enables communication among the containers 914A2-914N2. In some embodiments, the bridge networks 912 are software network bridges implemented via the DOCKER bridge driver. The DOCKER bridge driver enables default and user-defined network bridges.

The containers 914 are runtime instances of images. The containers 914 are described herein specifically as DOCKER containers, although other containerization technologies are contemplated as noted above. Each container 914 can include an image, an execution environment, and a standard set of instructions. In the illustrated example, the container$_{A-1}$ 914A1 is shown with the AV content encoder(s) 104, the multimedia framework 107, the NAVPAM 122, and the AVSSM 126. Alternatively, the AV content encoder(s) 104, the multimedia framework 107, the NAVPAM 122, the AVSSM 126, or any combination thereof can be distributed among multiple containers 914 across the same or different hosts 902.

The microservices 916 are applications that provide a single function. In some embodiments, each of the microservices 916 is provided by one of the containers 914, although each of the containers 914 may contain multiple microservices 916. For example, the microservices 916 can include, but are not limited to, server, database, and other executable applications to be run in an execution environment provided by a container 914. The microservices 916 can provide any type of functionality, and therefore all the possible functions cannot be listed herein. Those skilled in the art will appreciate the use of the microservices 916 along with the containers 914 to improve many aspects of the containerized cloud architecture 900, such as reliability, security, agility, and efficiency, for example. In some embodiments, the AV content encoder(s) 104, the multimedia framework 107, the NAVPAM 122, the AVSSM 126, or some combination thereof are embodied as part of the microservices 916.

Figure 10:
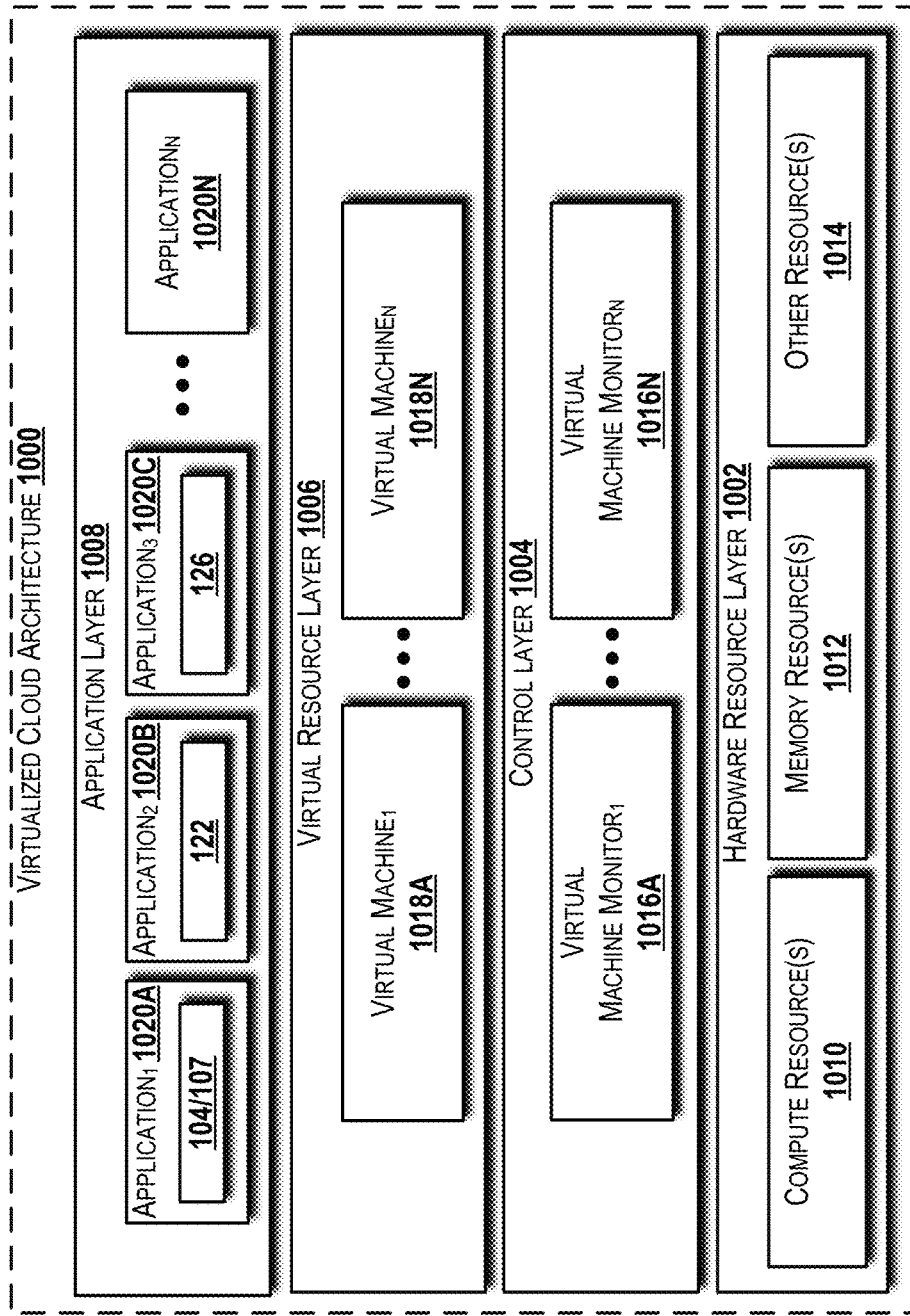
FIG. 10 is a block diagram illustrating an example virtualized cloud architecture and components thereof capable of implementing aspects of the embodiments presented herein.

Turning now to FIG. 10, a block diagram illustrating an example virtualized cloud architecture 1000 and components thereof will be described, according to an exemplary embodiment. The virtualized cloud architecture 1000 can be utilized to implement various elements disclosed herein. In some embodiments, the AV synchronization system 100, at least in part, is implemented in the virtualized cloud architecture 1000.

The virtualized cloud architecture 1000 is a shared infrastructure that can support multiple services and network applications. The illustrated virtualized cloud architecture 1000 includes a hardware resource layer 1002, a control layer 1004, a virtual resource layer 1006, and an application layer 1008 that work together to perform operations as will be described in detail herein.

The hardware resource layer 1002 provides hardware resources, which, in the illustrated embodiment, include one or more compute resources 1010, one or more memory resources 1012, and one or more other resources 1014. The compute resource(s) 1010 can include one or more hardware components that perform computations to process data, and/or to execute computer-executable instructions of one or more application programs, operating systems, and/or other software. The compute resources 1010 can include one or more central processing units ("CPUs") configured with one or more processing cores. The compute resources 1010 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 1010 can include one or more discrete GPUs. In some other embodiments, the compute resources 1010 can include CPU and GPU components that are configured in accordance with a co-processing CPU/GPU computing model, wherein the sequential part of an application executes on the CPU and the computationally-intensive part is accelerated by the GPU. The compute resources 1010 can include one or more system-on-chip ("SoC") components along with one or more other components, including, for example, one or more of the memory resources 1012, and/or one or more of the other resources 1014. In some embodiments, the compute resources 1010 can be or can include one or more SNAPDRAGON SoCs, available from QUALCOMM; one or more TEGRA SoCs, available from NVIDIA; one or more HUMMINGBIRD SoCs, available from SAMSUNG; one or more Open Multimedia Application Platform ("OMAP") SoCs, available from TEXAS INSTRUMENTS; one or more customized versions of any of the above SoCs; and/or one or more proprietary SoCs. The compute resources 1010 can be or can include one or more hardware components architected in accordance with an advanced reduced instruction set computing ("RISC") machine ("ARM") architecture, available for license from ARM HOLDINGS. Alternatively, the compute resources 1010 can be or can include one or more hardware components architected in accordance with an x86 architecture, such an architecture available from INTEL CORPORATION of Mountain View, Calif., and others. Those skilled in the art will appreciate the implementation of the compute resources 1010 can utilize various computation architectures, and as such, the compute resources 1010 should not be construed as being limited to any particular computation architecture or combination of computation architectures, including those explicitly disclosed herein.

The memory resource(s) 1012 can include one or more hardware components that perform storage operations, including temporary or permanent storage operations. In some embodiments, the memory resource(s) 1012 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 1010.

The other resource(s) 1014 can include any other hardware resources that can be utilized by the compute resources(s) 1010 and/or the memory resource(s) 1012 to perform operations described herein. The other resource(s) 1014 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 1002 can be virtualized by one or more virtual machine monitors ("VMMs") 1016A-1016N (also known as "hypervisors;" hereinafter "VMMs 1016") operating within the control layer 1004 to manage one or more virtual resources that reside in the virtual resource layer 1006. The VMMs 1016 can be or can include software, firmware, and/or hardware that alone or in combination with other software, firmware, and/or hardware, manages one or more virtual resources operating within the virtual resource layer 1006.

The virtual resources operating within the virtual resource layer 1006 can include abstractions of at least a portion of the compute resources 1010, the memory resources 1012, the other resources 1014, or any combination thereof. These abstractions are referred to herein as virtual machines ("VMs"). In the illustrated embodiment, the virtual resource layer 1006 includes VMs 1018A-1018N (hereinafter "VMs 1018"). Each of the VMs 1018 can execute one or more applications 1020A-1020N in the application layer 1008. Also in the illustrated embodiment, the AV content encoder(s) 104 and the multimedia framework 107 are shown as the application 1020A or a portion thereof; the NAVPAM 122 is shown as the application 1020B or a portion thereof; and the AVSSM 126 is shown as the application 1020C or a portion thereof.

Figure 11:
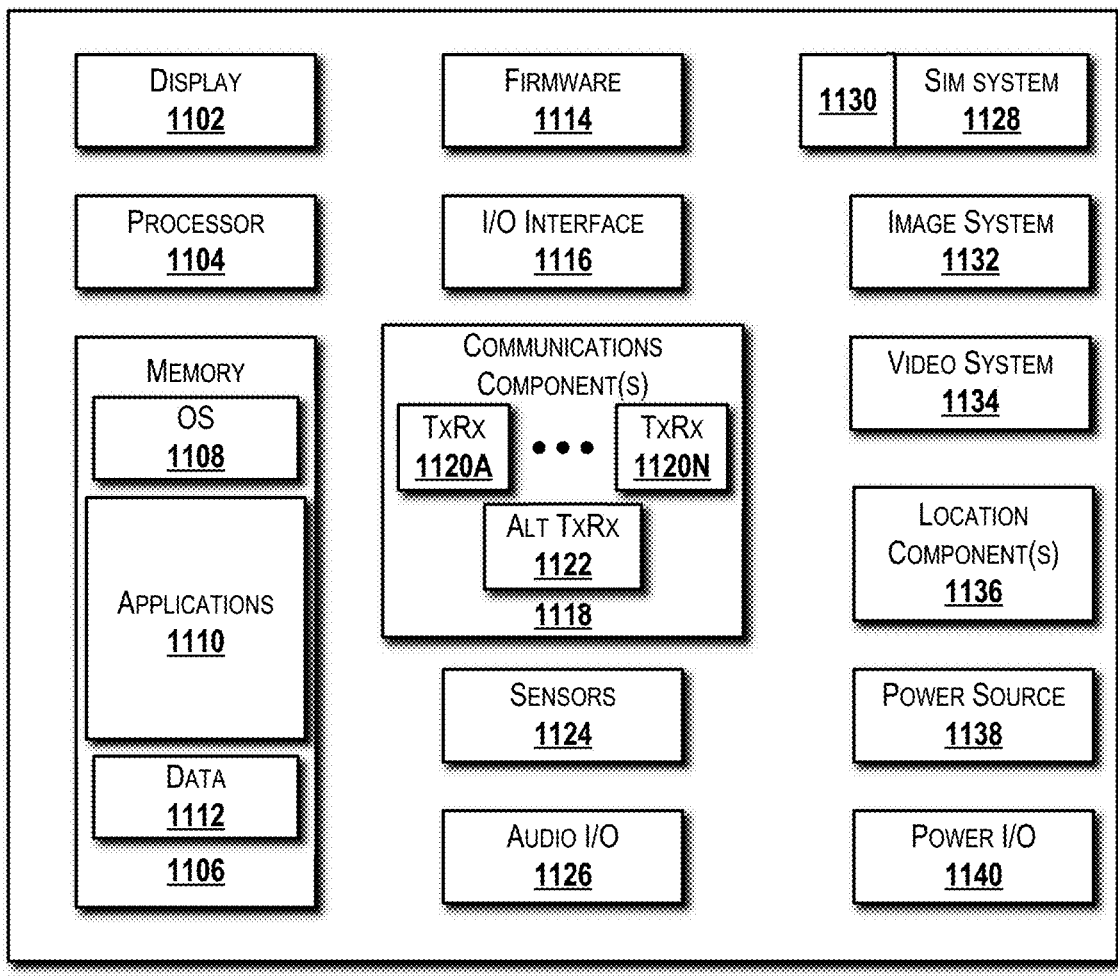
FIG. 11 is a block diagram illustrating an example mobile device capable of implementing aspects of the embodiments disclosed herein.

Turning now to FIG. 11, an illustrative mobile device 1100 and components thereof will be described. The mobile device 1100 is representative of a device that can playback the post-encode AV content 106, such as part of a video streaming service provided to the mobile device 1100. While connections are not shown between the various components illustrated in FIG. 11, it should be understood that some, none, or all of the components illustrated in FIG. 11 can be configured to interact with one another to carry out various device functions. In some embodiments, the components are arranged so as to communicate via one or more busses (not shown). Thus, it should be understood that FIG. 11 and the following description are intended to provide a general understanding of a suitable environment in which various aspects of embodiments can be implemented, and should not be construed as being limiting in any way.

As illustrated in FIG. 11, the mobile device 1100 can include a display 1102 for displaying data. According to various embodiments, the display 1102 can be configured to display the post-encode AV content 106, various GUI elements, text, images, video, virtual keypads and/or keyboards, messaging data, notification messages, metadata, Internet content, device status, time, date, calendar data, device preferences, map and location data, combinations thereof, and/or the like. The mobile device 1100 also can include a processor 1104 and a memory or other data storage device ("memory") 1106. The processor 1104 can be configured to process data and/or can execute computer-executable instructions stored in the memory 1106. The computer-executable instructions executed by the processor 1104 can include, for example, an operating system 1108, one or more applications 1110, other computer-executable instructions stored in the memory 1106, or the like. In some embodiments, the applications 1110 also can include a UI application (not illustrated in FIG. 11).

The UI application can interface with the operating system 1108 to facilitate user interaction with functionality and/or data stored at the mobile device 1100 and/or stored elsewhere. In some embodiments, the operating system 1108 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 1104 to aid a user in entering/deleting data, entering and setting user IDs and passwords for device access, configuring settings, manipulating content and/or settings, multimode interaction, interacting with other applications 1110, and otherwise facilitating user interaction with the operating system 1108, the applications 1110, and/or other types or instances of data 1112 that can be stored at the mobile device 1100.

The applications 1110, the data 1112, and/or portions thereof can be stored in the memory 1106 and/or in a firmware 1114, and can be executed by the processor 1104. The firmware 1114 also can store code for execution during device power up and power down operations. It can be appreciated that the firmware 1114 can be stored in a volatile or non-volatile data storage device including, but not limited to, the memory 1106 and/or a portion thereof.

The mobile device 1100 also can include an input/output ("I/O") interface 1116. The I/O interface 1116 can be configured to support the input/output of data such as location information, presence status information, user IDs, passwords, and application initiation (start-up) requests. In some embodiments, the I/O interface 1116 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 1100 can be configured to synchronize with another device to transfer content to and/or from the mobile device 1100. In some embodiments, the mobile device 1100 can be configured to receive updates to one or more of the applications 1110 via the I/O interface 1116, though this is not necessarily the case. In some embodiments, the I/O interface 1116 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 1116 may be used for communications between the mobile device 1100 and a network device or local device.

The mobile device 1100 also can include a communications component 1118. The communications component 1118 can be configured to interface with the processor 1104 to facilitate wired and/or wireless communications with one or more networks, such as a packet data network 1204 (shown in FIG. 12), the Internet, or some combination thereof. In some embodiments, the communications component 1118 includes a multimode communications subsystem for facilitating communications via the cellular network and one or more other networks.

The communications component 1118, in some embodiments, includes one or more transceivers. The one or more transceivers, if included, can be configured to communicate over the same and/or different wireless technology standards with respect to one another. For example, in some embodiments, one or more of the transceivers of the communications component 1118 may be configured to communicate using Global System for Mobile communications ("GSM"), Code-Division Multiple Access ("CDMA") CDMAONE, CDMA2000, Long-Term Evolution ("LTE") LTE, and various other 2G, 2.5G, 3G, 4G, 4.5G, 5G, and greater generation technology standards. Moreover, the communications component 1118 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiple Access ("OFDMA"), Space-Division Multiple Access ("SDMA"), and the like.

In addition, the communications component 1118 may facilitate data communications using General Packet Radio Service ("GPRS"), Enhanced Data services for Global Evolution ("EDGE"), the High-Speed Packet Access ("HSPA") protocol family including High-Speed Downlink Packet Access ("HSDPA"), Enhanced Uplink ("EUL") (also referred to as High-Speed Uplink Packet Access ("HSUPA"), HSPA+, and various other current and future wireless data access standards. In the illustrated embodiment, the communications component 1118 can include a first transceiver ("TxRx") 1120A that can operate in a first communications mode (e.g., GSM). The communications component 1118 also can include an $N^{th}$ transceiver ("TxRx") 1120N that can operate in a second communications mode relative to the first transceiver 1120A (e.g., UMTS). While two transceivers 1120A-1120N (hereinafter collectively and/or generically referred to as "transceivers 1120") are shown in FIG. 11, it should be appreciated that less than two, two, and/or more than two transceivers 1120 can be included in the communications component 1118.

The communications component 1118 also can include an alternative transceiver ("Alt TxRx") 1122 for supporting other types and/or standards of communications. According to various contemplated embodiments, the alternative transceiver 1122 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 1118 also can facilitate reception from terrestrial radio networks, digital satellite radio networks, internet-based radio service networks, combinations thereof, and the like. The communications component 1118 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 1100 also can include one or more sensors 1124. The sensors 1124 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 1100 may be provided by an audio I/O component 1126. The audio I/O component 1126 of the mobile device 1100 can include one or more speakers for the output of audio signals, one or more microphones for the collection and/or input of audio signals, and/or other audio input and/or output devices.

The illustrated mobile device 1100 also can include a subscriber identity module ("SIM") system 1128. The SIM system 1128 can include a universal SIM ("USIM"), a universal integrated circuit card ("UICC") and/or other identity devices. The SIM system 1128 can include and/or can be connected to or inserted into an interface such as a slot interface 1130. In some embodiments, the slot interface 1130 can be configured to accept insertion of other identity cards or modules for accessing various types of networks. Additionally, or alternatively, the slot interface 1130 can be configured to accept multiple subscriber identity cards. Because other devices and/or modules for identifying users and/or the mobile device 1100 are contemplated, it should be understood that these embodiments are illustrative, and should not be construed as being limiting in any way.

The mobile device 1100 also can include an image capture and processing system 1132 ("image system"). The image system 1132 can be configured to capture or otherwise obtain photos, videos, and/or other visual information. As such, the image system 1132 can include cameras, lenses, charge-coupled devices ("CCDs"), combinations thereof, or the like. The mobile device 1100 may also include a video system 1134. The video system 1134 can be configured to capture, process, record, modify, and/or store video content. Photos and videos obtained using the image system 1132 and the video system 1134, respectively, may be added as message content to an MMS message, email message, and sent to another device. The video and/or photo content also can be shared with other devices via various types of data transfers via wired and/or wireless communication devices as described herein.

The mobile device 1100 also can include one or more location components 1136. The location components 1136 can be configured to send and/or receive signals to determine a geographic location of the mobile device 1100. According to various embodiments, the location components 1136 can send and/or receive signals from global positioning system ("GPS") devices, assisted-GPS ("A-GPS") devices, WI-FI/WIMAX and/or cellular network triangulation data, combinations thereof, and the like. The location component 1136 also can be configured to communicate with the communications component 1118 to retrieve triangulation data for determining a location of the mobile device 1100. In some embodiments, the location component 1136 can interface with cellular network nodes, telephone lines, satellites, location transmitters and/or beacons, wireless network transmitters and receivers, combinations thereof, and the like. In some embodiments, the location component 1136 can include and/or can communicate with one or more of the sensors 1124 such as a compass, an accelerometer, and/or a gyroscope to determine the orientation of the mobile device 1100. Using the location component 1136, the mobile device 1100 can generate and/or receive data to identify its geographic location, or to transmit data used by other devices to determine the location of the mobile device 1100. The location component 1136 may include multiple components for determining the location and/or orientation of the mobile device 1100.

The illustrated mobile device 1100 also can include a power source 1138. The power source 1138 can include one or more batteries, power supplies, power cells, and/or other power subsystems including alternating current ("AC") and/or direct current ("DC") power devices. The power source 1138 also can interface with an external power system or charging equipment via a power I/O component 1140. Because the mobile device 1100 can include additional and/or alternative components, the above embodiment should be understood as being illustrative of one possible operating environment for various embodiments of the concepts and technologies described herein. The described embodiment of the mobile device 1100 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 1100 or other devices or computers described herein, such as the computer system 800 described above with reference to FIG. 8.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 1100 in order to store and execute the software components presented herein. It is also contemplated that the mobile device 1100 may not include all of the components shown in FIG. 11, may include other components that are not explicitly shown in FIG. 11, or may utilize an architecture completely different than that shown in FIG. 11.

Figure 12:
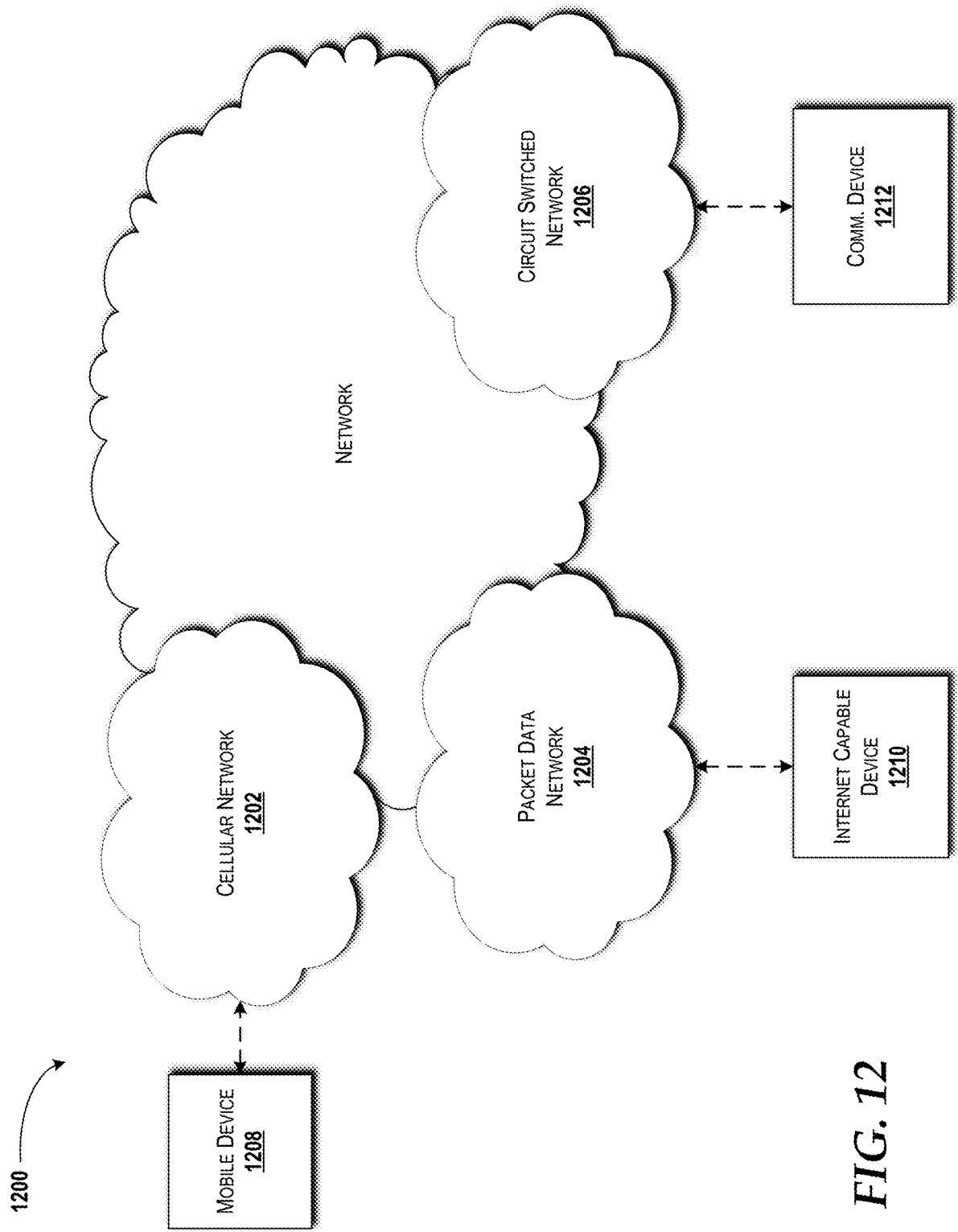
FIG. 12 is a diagram illustrating a network, according to an illustrative embodiment.

Turning now to FIG. 12, details of a network 1200 are illustrated, according to an illustrative embodiment. The network 1200 includes a cellular network 1202, a packet data network 1204, and a circuit switched network 1206. In some embodiments, the network 818 is or includes the network 1200. Moreover, the AV synchronization system 100 can be configured to communicate over the network 1200.

The cellular network 1202 can include various components such as, but not limited to, base transceiver stations ("BTSs"), Node-Bs or e-Node-Bs, base station controllers ("BSCs"), radio network controllers ("RNCs"), mobile switching centers ("MSCs"), mobility management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, and the like. The cellular network 1202 also includes radios and nodes for receiving and transmitting voice, data, and combinations thereof to and from radio transceivers, networks, the packet data network 1204, and the circuit switched network 1206.

A mobile communications device 1208, such as, for example, a cellular telephone, a user equipment, a mobile terminal, a PDA, a laptop computer, a handheld computer, and combinations thereof, can be operatively connected to the cellular network 1202. The mobile communications device 1208 can be configured similar to or the same as the mobile device 1100 described above with reference to FIG. 9.

The cellular network 1202 can be configured as a GSM) network and can provide data communications via GPRS and/or EDGE. Additionally, or alternatively, the cellular network 1202 can be configured as a 3G Universal Mobile Telecommunications System ("UMTS") network and can provide data communications via the HSPA protocol family, for example, HSDPA, EUL, and HSPA+. The cellular network 1202 also is compatible with 4G mobile communications standards such as LTE, 5G mobile communications standards, or the like, as well as evolved and future mobile standards.

The packet data network 1204 includes various systems, devices, servers, computers, databases, and other devices in communication with one another, as is generally known. In some embodiments, the packet data network 1204 is or includes one or more WI-FI networks, each of which can include one or more WI-FI access points, routers, switches, and other WI-FI network components. The packet data network 1204 devices are accessible via one or more network links. The servers often store various files that are provided to a requesting device such as, for example, a computer, a terminal, a smartphone, or the like. Typically, the requesting device includes software for executing a web page in a format readable by the browser or other software. Other files and/or data may be accessible via "links" in the retrieved files, as is generally known. In some embodiments, the packet data network 1204 includes or is in communication with the Internet. The packet data network 1204 can be or can include one or more of the PDNs 122A-122N. The circuit switched network 1206 includes various hardware and software for providing circuit switched communications. The circuit switched network 1206 may include, or may be, what is often referred to as a plain old telephone system ("POTS"). The functionality of a circuit switched network 1206 or other circuit-switched network are generally known and will not be described herein in detail.

The illustrated cellular network 1202 is shown in communication with the packet data network 1204 and a circuit switched network 1206, though it should be appreciated that this is not necessarily the case. One or more Internet-capable devices 1210 such as a laptop, a portable device, or another suitable device, can communicate with one or more cellular networks 1202, and devices connected thereto, through the packet data network 1204. It also should be appreciated that the Internet-capable device 1210 can communicate with the packet data network 1204 through the circuit switched network 1206, the cellular network 1202, and/or via other networks (not illustrated).

As illustrated, a communications device 1212, for example, a telephone, facsimile machine, modem, computer, or the like, can be in communication with the circuit switched network 1206, and therethrough to the packet data network 1204 and/or the cellular network 1202. It should be appreciated that the communications device 1212 can be an Internet-capable device, and can be substantially similar to the Internet-capable device 1210.

Figure 13:
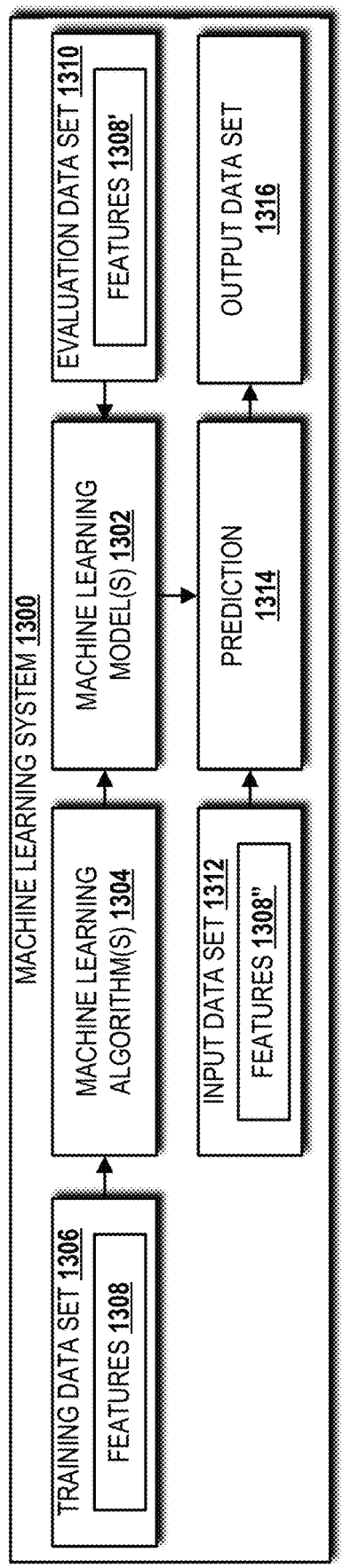
FIG. 13 is a diagram illustrating a machine learning system, according to an illustrative embodiment.

Turning now to FIG. 13, a machine learning system 1300 capable of implementing aspects of the embodiments disclosed herein will be described. In some embodiments, aspects of the NAVPAM 122 and/or the AVSSM 126 can be enhanced through the use of machine learning and/or artificial intelligence applications. Accordingly, the AV synchronization system 100 can include the machine learning system 1300 or can be in communication with the machine learning system 1300.

The illustrated machine learning system 1300 includes one or more machine learning models 1302. The machine learning models 1302 can include supervised and/or semi-supervised learning models. The machine learning model(s) 1302 can be created by the machine learning system 1300 based upon one or more machine learning algorithms 1304. The machine learning algorithm(s) 1304 can be any existing, well-known algorithm, any proprietary algorithms, or any future machine learning algorithm. Some example machine learning algorithms 1304 include, but are not limited to, neural networks, gradient descent, linear regression, logistic regression, linear discriminant analysis, classification tree, regression tree, Naive Bayes, K-nearest neighbor, learning vector quantization, support vector machines, and the like. Classification and regression algorithms might find particular applicability to the concepts and technologies disclosed herein. Those skilled in the art will appreciate the applicability of various machine learning algorithms 1304 based upon the problem(s) to be solved by machine learning via the machine learning system 1300.

The machine learning system 1300 can control the creation of the machine learning models 1302 via one or more training parameters. In some embodiments, the training parameters are selected modelers at the direction of an enterprise, for example. Alternatively, in some embodiments, the training parameters are automatically selected based upon data provided in one or more training data sets 1306. The training parameters can include, for example, a learning rate, a model size, a number of training passes, data shuffling, regularization, and/or other training parameters known to those skilled in the art. The training data in the training data sets 1306.

The learning rate is a training parameter defined by a constant value. The learning rate affects the speed at which the machine learning algorithm 1304 converges to the optimal weights. The machine learning algorithm 1304 can update the weights for every data example included in the training data set 1306. The size of an update is controlled by the learning rate. A learning rate that is too high might prevent the machine learning algorithm 1304 from converging to the optimal weights. A learning rate that is too low might result in the machine learning algorithm 1304 requiring multiple training passes to converge to the optimal weights.

The model size is regulated by the number of input features ("features") 1308 in the training data set 1306. A greater the number of features 1308 yields a greater number of possible patterns that can be determined from the training data set 1306. The model size should be selected to balance the resources (e.g., compute, memory, storage, etc.) needed for training and the predictive power of the resultant machine learning model 1302.

The number of training passes indicates the number of training passes that the machine learning algorithm 1304 makes over the training data set 1306 during the training process. The number of training passes can be adjusted based, for example, on the size of the training data set 1306, with larger training data sets being exposed to fewer training passes in consideration of time and/or resource utilization. The effectiveness of the resultant machine learning model 1302 can be increased by multiple training passes.

Data shuffling is a training parameter designed to prevent the machine learning algorithm 1304 from reaching false optimal weights due to the order in which data contained in the training data set 1306 is processed. For example, data provided in rows and columns might be analyzed first row, second row, third row, etc., and thus an optimal weight might be obtained well before a full range of data has been considered. By data shuffling, the data contained in the training data set 1306 can be analyzed more thoroughly and mitigate bias in the resultant machine learning model 1302.

Regularization is a training parameter that helps to prevent the machine learning model 1302 from memorizing training data from the training data set 1306. In other words, the machine learning model 1302 fits the training data set 1306, but the predictive performance of the machine learning model 1302 is not acceptable. Regularization helps the machine learning system 1300 avoid this overfitting/memorization problem by adjusting extreme weight values of the features 1308. For example, a feature that has a small weight value relative to the weight values of the other features in the training data set 1306 can be adjusted to zero.

The machine learning system 1300 can determine model accuracy after training by using one or more evaluation data sets 1310 containing the same features 1308' as the features 1308 in the training data set 1306. This also prevents the machine learning model 1302 from simply memorizing the data contained in the training data set 1306. The number of evaluation passes made by the machine learning system 1300 can be regulated by a target model accuracy that, when reached, ends the evaluation process and the machine learning model 1302 is considered ready for deployment.

After deployment, the machine learning model 1302 can perform a prediction operation ("prediction") 1314 with an input data set 1312 having the same features 1308" as the features 1308 in the training data set 1306 and the features 1308' of the evaluation data set 1310. The results of the prediction 1314 are included in an output data set 1316 consisting of predicted data. The machine learning model 1302 can perform other operations, such as regression, classification, and others. As such, the example illustrated in FIG. 13 should not be construed as being limiting in any way.

Based on the foregoing, it should be appreciated that concepts and technologies directed to audio and video synchronization have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
    simultaneously capturing, by an audio-video synchronization system comprising a processor, samples of a pre-encode media stream and a post-encode media stream, wherein the pre-encode media stream comprises audio-visual content prior to being encoded, and wherein the post-encode media stream comprises the audio-visual content after being encoded;
    generating, by the audio-video synchronization system, from a pre-encode video component of the pre-encode media stream and a post-encode video component of the post-encode video component, a plurality of thumbnail images;
    aligning, by the audio-video synchronization system, the pre-encode video component of the pre-encode media stream with the post-encode video component, wherein aligning the pre-encode video component of the pre-encode media stream with the post-encode video component comprises
        determining a plurality of search ranges for an iterative search process used to find a first alignment point between the pre-encode video component and the post-encode video component,
        comparing the plurality of thumbnail images to determine a plurality of distance values, and
        determining a second alignment point between the pre-encode video component and the post-encode video component, wherein the second alignment point is where a distance value of the plurality of distance values is minimized;
    determining, by the audio-video synchronization system, based upon the first alignment point and the second alignment point, a video offset between the pre-encode video component and the post-encode video component;
    aligning, by the audio-video synchronization system, a pre-encode audio component of the pre-encode media stream with a post-encode audio component of the post-encode media stream;
    determining, by the audio-video synchronization system, an audio offset between the pre-encode audio component and the post-encode audio component; and
    comparing, by the audio-video synchronization system, the video offset and the audio offset to determine if the post-encode media stream is synchronized with the pre-encode media stream.

2. The method of claim 1, wherein:
    aligning, by the audio-video synchronization system, the pre-encode video component of the pre-encode media stream with the post-encode video component; and aligning, by the audio-video synchronization system, the pre-encode audio component of the pre-encode media stream with the post-encode audio component of the post-encode media stream are performed in parallel; and
    determining, by the audio-video synchronization system, the video offset between the pre-encode video component and the post-encode video component; and determining, by the audio-video synchronization system, the audio offset between the pre-encode audio component and the post-encode audio component are performed in parallel.

3. The method of claim 1, wherein aligning, by the audio-video synchronization system, the pre-encode video component of the pre-encode media stream with the post-encode video component; and determining, by the audio-video synchronization system, the video offset between the pre-encode video component and the post-encode video component are performed via execution, by the audio-video synchronization system, of a non-annotated video processing algorithm module.

4. The method of claim 1, wherein aligning, by the audio-video synchronization system, the pre-encode audio component of the pre-encode media stream with the post-encode audio component of the post-encode media stream; and determining, by the audio-video synchronization system, the audio offset between the pre-encode audio component and the post-encode audio component are performed via execution, by the audio-video synchronization system, of an audio-video synchronization script module.

5. The method of claim 4, wherein executing, by the audio-video synchronization system, the audio-video synchronization script module comprises:
dividing the pre-encode audio component and the post-encode audio component into a plurality of time slices, wherein each time slice of the plurality of time slices is associated with a corresponding video frame;
generating acoustic fingerprints based upon the plurality of time slices;
performing fingerprint matching using the acoustic fingerprints and determining the audio offset therefrom; and
comparing the audio offset and the video offset.

6. The method of claim 5, wherein executing, by the audio-video synchronization system, the audio-video synchronization script module further comprises:
determining, based upon comparing the audio offset and the video offset, whether or not the pre-encode media stream and the post-encode media stream are synchronized; and
outputting an audio-visual synchronization evaluation result comprising an indication of whether or not the pre-encode media stream and the post-encode media stream are synchronized.

7. A system comprising:
a processor; and
a memory that stores instructions that, when executed by the processor, cause the processor to perform operations comprising
simultaneously capturing samples of a pre-encode media stream and a post-encode media stream, wherein the pre-encode media stream comprises audio-visual content prior to being encoded, and wherein the post-encode media stream comprises the audio-visual content after being encoded,
generating, from a pre-encode video component of the pre-encode media stream and a post-encode video component of the post-encode video component, a plurality of thumbnail images,
aligning the pre-encode video component of the pre-encode media stream with the post-encode video component, wherein aligning the pre-encode video component of the pre-encode media stream with the post-encode video component comprises
determining a plurality of search ranges for an iterative search process used to find a first alignment point between the pre-encode video component and the post-encode video component,
comparing the plurality of thumbnail images to determine a plurality of distance values, and
determining a second alignment point between the pre-encode video component and the post-encode video component, wherein the second alignment point is where a distance value of the plurality of distance values is minimized,
determining, based upon the first alignment point and the second alignment point,
a video offset between the pre-encode video component and the post-encode video component,
aligning a pre-encode audio component of the pre-encode media stream with a post-encode audio component of the post-encode media stream,
determining an audio offset between the pre-encode audio component and the post-encode audio component, and
comparing the video offset and the audio offset to determine if the post-encode media stream is synchronized with the pre-encode media stream.

8. The system of claim 7, wherein:
aligning the pre-encode video component of the pre-encode media stream with the post-encode video component; and aligning the pre-encode audio component of the pre-encode media stream with the post-encode audio component of the post-encode media stream are performed in parallel; and
determining the video offset between the pre-encode video component and the post-encode video component; and determining the audio offset between the pre-encode audio component and the post-encode audio component are performed in parallel.

9. The system of claim 7, wherein aligning the pre-encode video component of the pre-encode media stream with the post-encode video component; and determining the video offset between the pre-encode video component and the post-encode video component are performed via execution of a non-annotated video processing algorithm module.

10. The system of claim 7, wherein aligning the pre-encode audio component of the pre-encode media stream with the post-encode audio component of the post-encode media stream; and determining the audio offset between the pre-encode audio component and the post-encode audio component are performed via execution of an audio-video synchronization script module.

11. The system of claim 10, wherein executing the audio-video synchronization script module comprises:
dividing the pre-encode audio component and the post-encode audio component into a plurality of time slices, wherein each time slice of the plurality of time slices is associated with a corresponding video frame;
generating acoustic fingerprints based upon the plurality of time slices;
performing fingerprint matching using the acoustic fingerprints and determining the audio offset therefrom; and
comparing the audio offset and the video offset.

12. The system of claim 11, wherein executing the audio-video synchronization script module further comprises:
determining, based upon comparing the audio offset and the video offset, whether or not the pre-encode media stream and the post-encode media stream are synchronized; and
outputting an audio-visual synchronization evaluation result comprising an indication of whether or not the pre-encode media stream and the post-encode media stream are synchronized.

13. A computer-readable storage medium having instructions stored thereon that, when executed by a processor of, cause the processor to perform operations comprising:
simultaneously capturing samples of a pre-encode media stream and a post-encode media stream, wherein the pre-encode media stream comprises audio-visual content prior to being encoded, and wherein the post-encode media stream comprises the audio-visual content after being encoded;

generating, from a pre-encode video component and a post-encode video component, a plurality of thumbnail images;

aligning the pre-encode video component of the pre-encode media stream with the post-encode video component, wherein aligning the pre-encode video component of the pre-encode media stream with the post-encode video component comprises determining a plurality of search ranges for an iterative search process used to find a first alignment point between the pre-encode video component and the post-encode video component, comparing the plurality of thumbnail images to determine a plurality of distance values, and determining a second alignment point between the pre-encode video component and the post-encode video component, wherein the second alignment point is where a distance value of the plurality of distance values is minimized;

determining, based upon the first alignment point and the second alignment point, a video offset between the pre-encode video component and the post-encode video component;

aligning a pre-encode audio component of the pre-encode media stream with a post-encode audio component of the post-encode media stream;

determining an audio offset between the pre-encode audio component and the post-encode audio component; and comparing the video offset and the audio offset to determine if the post-encode media stream is synchronized with the pre-encode media stream.

14. The computer-readable storage medium of claim 13, wherein:

aligning the pre-encode video component of the pre-encode media stream with the post-encode video component; and aligning the pre-encode audio component of the pre-encode media stream with the post-encode audio component of the post-encode media stream are performed in parallel; and determining the video offset between the pre-encode video component and the post-encode video component; and determining the audio offset between the pre-encode audio component and the post-encode audio component are performed in parallel.

15. The computer-readable storage medium of claim 13, wherein aligning the pre-encode video component of the pre-encode media stream with the post-encode video component; and determining the video offset between the pre-encode video component and the post-encode video component are performed via execution of a non-annotated video processing algorithm module.

16. The computer-readable storage medium of claim 13, wherein aligning the pre-encode audio component of the pre-encode media stream with the post-encode audio component of the post-encode media stream; and determining the audio offset between the pre-encode audio component and the post-encode audio component are performed via execution of an audio-video synchronization script module.

17. The computer-readable storage medium of claim 16, wherein executing the audio-video synchronization script module comprises:

dividing the pre-encode audio component and the post-encode audio component into a plurality of time slices, wherein each time slice of the plurality of time slices is associated with a corresponding video frame;

generating acoustic fingerprints based upon the plurality of time slices;

performing fingerprint matching using the acoustic fingerprints and determining the audio offset therefrom;

comparing the audio offset and the video offset;

determining, based upon comparing the audio offset and the video offset, whether or not the pre-encode media stream and the post-encode media stream are synchronized; and outputting an audio-visual synchronization evaluation result comprising an indication of whether or not the pre-encode media stream and the post-encode media stream are synchronized.

\* \* \* \* \*